(12) United States Patent
Zhou et al.

(10) Patent No.: US 9,242,243 B2
(45) Date of Patent: Jan. 26, 2016

(54) ANION EXCHANGE POLYELECTROLYTES

(75) Inventors: Junfeng Zhou, Atlanta, GA (US); Paul A. Kohl, Atlanta, GA (US); Murat Unlu, Newark, DE (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 13/497,177

(22) PCT Filed: Sep. 24, 2010

(86) PCT No.: PCT/US2010/050152
§ 371 (c)(1),
(2), (4) Date: Jun. 6, 2012

(87) PCT Pub. No.: WO2011/038198
PCT Pub. Date: Mar. 31, 2011

(65) Prior Publication Data
US 2012/0238648 A1 Sep. 20, 2012

Related U.S. Application Data

(60) Provisional application No. 61/245,517, filed on Sep. 24, 2009, provisional application No. 61/312,434, filed on Mar. 10, 2010.

(51) Int. Cl.
*B01J 41/12* (2006.01)
*B01J 49/00* (2006.01)
*C08G 59/32* (2006.01)
(Continued)

(52) U.S. Cl.
CPC ............. *B01J 49/00* (2013.01); *C08G 59/3218* (2013.01); *C08L 63/00* (2013.01); *C08L 81/06* (2013.01); *H01M 8/083* (2013.01); *H01M 8/103* (2013.01); *H01M 8/1027* (2013.01); *H01M 8/1039* (2013.01); *Y02E 60/521* (2013.01)

(58) Field of Classification Search
USPC ........................................ 521/27, 30
See application file for complete search history.

(56) References Cited

U.S. PATENT DOCUMENTS 3,378,505 A * 4/1968 Hay ................................ 521/30
4,703,104 A * 10/1987 Matsuo et al. ................. 528/211
(Continued)

FOREIGN PATENT DOCUMENTS

EP 0 640 653 A2 3/1995
WO WO 2009/019239 A1 2/2009

OTHER PUBLICATIONS

Notification of Transmittal of the International Search Report and the Written Opinion of the International Searching Authority, or the Declaration corresponding to PCT Application No. PCT/US10/50152 dated Nov. 19, 2010.
(Continued)

*Primary Examiner* — Peter D Mulcahy
*Assistant Examiner* — Henry Hu
(74) *Attorney, Agent, or Firm* — Myers Bigel Sibley & Sajovec, P.A.

(57) ABSTRACT

Provided according to some embodiments of the invention are anion exchange polyelectrolytes that include an at least partially fluorinated polyaromatic polymer backbone; and at least one cationic functional group pendant therefrom. Also provided are anion exchange membranes (AEMs) formed from at least one anion exchange polyelectrolyte according to an embodiment of the invention, and fuel cells including such AEMs.

23 Claims, 16 Drawing Sheets

(51) Int. Cl.
*C08L 63/00* (2006.01)
*C08L 81/06* (2006.01)
*H01M 8/08* (2006.01)
*H01M 8/10* (2006.01)

(56) References Cited

U.S. PATENT DOCUMENTS

| | | | | |
|---|---|---|---|---|
| 5,034,034 A | * | 7/1991 | Sanders et al. | 96/10 |
| 5,124,430 A | * | 6/1992 | Parker et al. | 528/176 |
| 6,020,119 A | * | 2/2000 | Foucher et al. | 430/627 |
| 6,187,512 B1 | * | 2/2001 | Foucher et al. | 430/311 |
| 6,902,801 B2 | * | 6/2005 | Charnock et al. | 428/320.2 |
| 6,969,755 B2 | * | 11/2005 | Charnock et al. | 528/125 |
| 8,187,767 B2 | * | 5/2012 | Charnock et al. | 429/493 |
| 2002/0103306 A1 | * | 8/2002 | Kerres | B01D 71/68 525/390 |
| 2004/0005474 A1 | * | 1/2004 | Charnock et al. | 428/515 |
| 2008/0124604 A1 | | 5/2008 | Moussaoui et al. | |
| 2010/0141085 A1 | * | 6/2010 | Wu et al. | 310/311 |

OTHER PUBLICATIONS

Notification Concerning Transmittal of International Preliminary Report on Patentability (Chapter 1 of the Patent Cooperation Treaty) mailed Apr. 5, 2012.

Zhou et al. "Anionic polysulfone ionomers and membranes containing fluorenyl groups for anionic fuel cells", *J. Power Sources* 190:285-292 (2009).

* cited by examiner

ANION EXCHANGE POLYELECTROLYTES

CROSS-REFERENCE TO RELATED APPLICATIONS

This application is a 35 U.S.C. §371 national stage application of PCT Application No. PCT/US2010/050152, filed on Sep. 24, 2010, which claims priority from U.S. Provisional Application Ser. No. 61/245,517, filed Sep. 24, 2009, and U.S. Provisional Application Ser. No. 61/312,434, filed Mar. 10, 2010, the disclosure of each of which is hereby incorporated by reference herein in its entirety. The above-reference PCT International Application was published as International Publication No. WO 2011/038198 A1 on Mar. 31, 2011.

FIELD OF THE INVENTION

The present invention relates to anion exchange polyelectrolytes. The present invention also relates to alkaline fuel cells that include anion exchange polyelectrolytes.

BACKGROUND OF THE INVENTION

In recent years, interest has grown in the development of anionic exchange polyelectrolytes, particularly for those used as anion exchange membranes (AEM) in alkaline fuel cell applications. Due to the low overpotentials associated with many electrochemical reactions at high pH and the potential to forego noble metal catalysts, AEMs serve as an interesting counterpoint to the more widely developed and understood proton or cation exchange membranes (PEM or CEM).

However, most commercially-available AEMs are based on crosslinked polystyrene, which may not be very stable in alkaline or electrochemical environments. In addition, the polystyrene, such as aminated cross-linked polystyrene, may be blended with other polymers and fabric supports due to poor physical properties, and the addition of the other polymers may further limit the ionic conductivity and may decrease the chemical stability of the membrane. As such, there remains a need in the art for new anion exchange polyelectrolytes that have suitable stability and ionic conductivity.

SUMMARY OF THE INVENTION

Provided according to some embodiments of the invention are anion exchange polyelectrolytes that include an at least partially fluorinated polyaromatic polymer backbone and at least one cationic functional group pendant therefrom. In some embodiments, the at least partially fluorinated polyaromatic polymer backbone includes the repeating unit of Formula I:

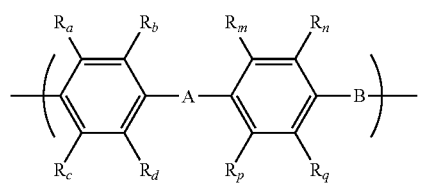

Formula I wherein
A is a single bond, alkylene, fluoroalkylene, or an arylene that is optionally substituted with a halide, alkyl, fluoroalkyl and/or cation functional group;

B is a single bond, oxygen or NR, wherein R is H, alkyl, fluoroalkyl or aryl, optionally substituted with halide, alkyl, a crosslinker and/or fluoroalkyl; and $R_a$, $R_b$, $R_c$, $R_d$, $R_m$, $R_n$, $R_p$ and $R_q$ are each independently selected from the group consisting of hydrogen, fluorine, a crosslinking group and a cationic functional group; and wherein at least one of A, B, $R_a$, $R_b$, $R_c$, $R_d$, $R_m$, $R_n$, $R_p$ and $R_q$ is fluorinated.

In some embodiments, the at least partially fluorinated polyaromatic polymer backbone includes a polysulfone repeating unit. In some embodiments, the at least partially fluorinated polyaromatic polymer backbone includes the repeating unit of Formula

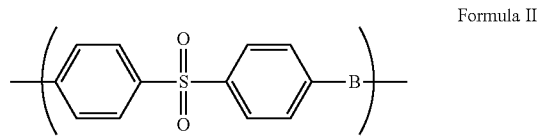

Formula II wherein B is a single bond, oxygen or NR, wherein R is H, alkyl, fluoroalkyl or aryl, optionally substituted with halide, alkyl, a crosslinker and/or fluoroalkyl.

In some embodiments, the at least partially fluorinated polyaromatic polymer backbone includes a polyarylene ether repeating unit, such as the repeating unit having the structure of Formula III:

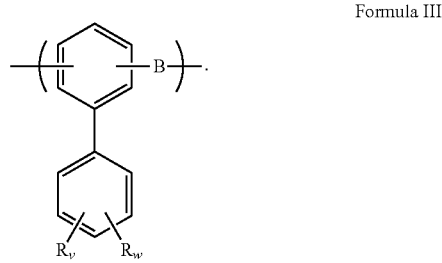

Formula III wherein B is a single bond, oxygen or NR, wherein R is H, alkyl, fluoroalkyl or aryl, optionally substituted with halide, alkyl, crosslinker and/or fluoroalkyl; and wherein $R_v$ and $R_w$ are each independently selected from the group consisting of hydrogen, fluorine, a crosslinking group and a cationic functional group.

In some embodiments of the invention, the at least partially fluorinated polyaromatic polymer backbone includes a cyanoarylene repeating unit, and in some embodiments, includes a fluorenyl repeating unit. For example, the at least partially fluorinated polyaromatic polymer backbone may include a fluorenyl repeating unit having the structure of Formula V:

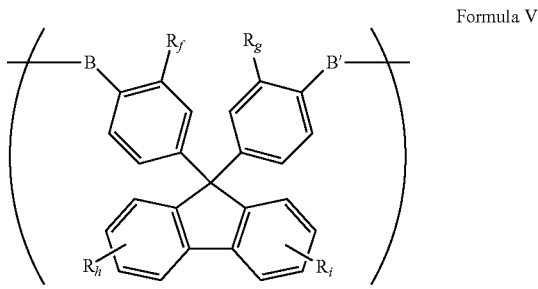

Formula V wherein B and B' are each independently a single bond, oxygen or NR, wherein R is H, alkyl, fluoroalkyl or aryl, optionally substituted with halide, alkyl, a crosslinker and/or fluoroalkyl; and In some embodiments of the invention, the cationic functional group of the at least partially fluorinated polyaromatic polymer backbone may include a polymer graft that includes at least one cationic group. For example, the cationic functional group may have the structure of Formula XI-A:

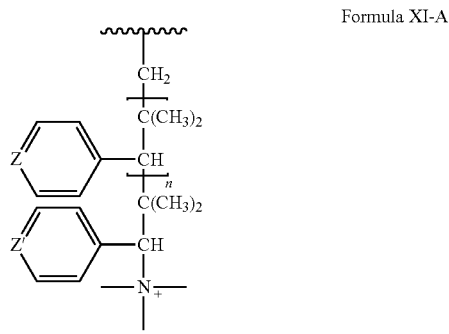

Formula XI-A wherein Z and Z' are each independently CH or $N^+$.

In some embodiments of the invention the at least partially fluorinated polyaromatic polymer backbone is crosslinked via a crosslinking group in the polyelectrolyte or via an external crosslinker.

Also provided according to some embodiments of the invention are anionic exchange membranes (AEMs) formed from at least one fluorinated anion exchange polyelectrolyte according to an embodiment of the invention. Further, in some embodiments the AEMs may be composite membranes.

Additionally, provided according to some embodiments of the invention are fuel cells that include an AEM according to an embodiment of the invention.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION OF EMBODIMENTS OF THE INVENTION

Figure 1A:
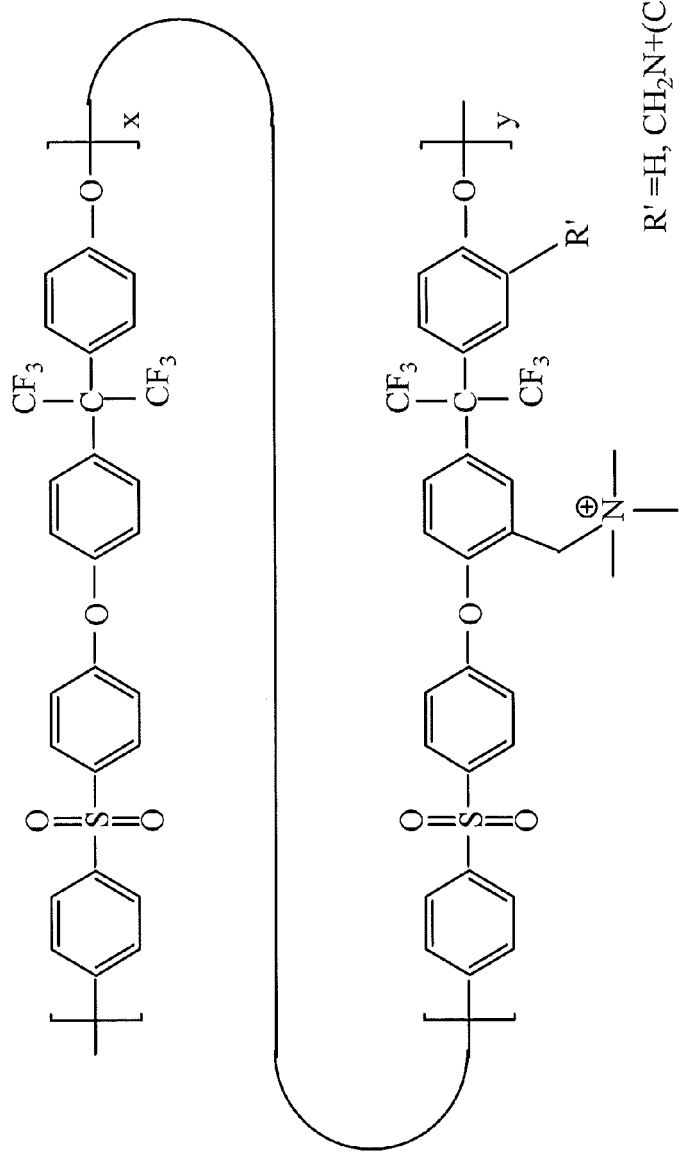
FIG. 1A shows the chemical structure of a fluorinated anion exchange polyelectrolyte according to some embodiments of the invention.

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items. Furthermore, the term "about," as used herein when referring to a measurable value such as an amount of a compound, dose, time, temperature, and the like, is meant to encompass variations of 20%, 10%, 5%, 1%, 0.5%, or even 0.1% of the specified amount. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

All patents, patent applications and publications referred to herein are incorporated by reference in their entirety. In the event of conflicting terminology, the present specification is controlling.

The embodiments described in one aspect of the present invention are not limited to the aspect described. The embodiments may also be applied to a different aspect of the invention as long as the embodiments do not prevent these aspects of the invention from operating for its intended purpose.

Chemical Definitions

As used herein the term "alkyl" refers to $C_{1-20}$ inclusive, linear (i.e.,"straight-chain"), branched, or cyclic, saturated or at least partially and in some cases fully unsaturated (i.e., alkenyl and alkynyl) hydrocarbon chains, including for example, methyl, ethyl, propyl, isopropyl, butyl, isobutyl, tent-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. Exemplary branched alkyl groups include, but are not limited to, isopropyl, isobutyl, tert-butyl. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms. In certain embodiments, "alkyl" refers, in particular, to $C_{1-5}$ straight-chain alkyls. In other embodiments, "alkyl" refers, in particular, to $C_{1-5}$ branched-chain alkyls.

Alkyl groups can optionally be substituted (a "substituted alkyl") with one or more alkyl group substituents, which can be the same or different. The term "alkyl group substituent" includes but is not limited to alkyl, substituted alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl. There can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

Thus, as used herein, the term "substituted alkyl" includes alkyl groups, as defined herein, in which one or more atoms or functional groups of the alkyl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto.

The term "aryl" is used herein to refer to an aromatic substituent that can be a single aromatic ring, or multiple aromatic rings that are fused together, linked covalently, or linked to a common group, such as, but not limited to, a methylene or ethylene moiety. The common linking group also can be a carbonyl, as in benzophenone, or oxygen, as in diphenylether, or nitrogen, as in diphenylamine. The term "aryl" specifically encompasses heterocyclic aromatic compounds. The aromatic ring(s) can comprise phenyl, naphthyl, biphenyl, diphenylether, diphenylamine and benzophenone, among others. In particular embodiments, the term "aryl" means a cyclic aromatic comprising about 5 to about 10 carbon atoms, e.g., 5, 6, 7, 8, 9, or 10 carbon atoms, and including 5- and 6-membered hydrocarbon and heterocyclic aromatic rings.

The aryl group can be optionally substituted (a "substituted aryl") with one or more aryl group substituents, which can be the same or different, wherein "aryl group substituent" includes alkyl, substituted alkyl, aryl, substituted aryl, aralkyl, hydroxyl, alkoxyl, aryloxyl, aralkyloxyl, carboxyl, acyl, halo, nitro, alkoxycarbonyl, aryloxycarbonyl, aralkoxycarbonyl, acyloxyl, acylamino, aroylamino, carbamoyl, alkylcarbamoyl, dialkylcarbamoyl, arylthio, alkylthio, alkylene, and —NR$^1$R", wherein R$^1$ and R" can each be independently hydrogen, alkyl, substituted alkyl, aryl, substituted aryl, and aralkyl.

Thus, as used herein, the term "substituted aryl" includes aryl groups, as defined herein, in which one or more atoms or functional groups of the aryl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto. Specific examples of aryl groups include, but are not limited to, cyclopentadienyl, phenyl, furan, thiophene, pyrrole, pyran, pyridine, imidazole, benzimidazole, isothiazole, isoxazole, pyrazole, pyrazine, triazine, pyrimidine, quinoline, isoquinoline, indole, carbazole, and the like.

"Cyclic" and "cycloalkyl" refer to a non-aromatic mono- or multicyclic ring system of about 3 to about 10 carbon atoms, e.g., 3, 4, 5, 6, 7, 8, 9, or 10 carbon atoms. The cycloalkyl group can be optionally partially unsaturated. The cycloalkyl group also can be optionally substituted with an alkyl group substituent as defined herein, oxo, and/or alkylene. There can be optionally inserted along the cyclic alkyl chain one or more oxygen, sulfur or substituted or unsubstituted nitrogen atoms, wherein the nitrogen substituent is hydrogen, alkyl, substituted alkyl, aryl, or substituted aryl, thus providing a heterocyclic group. Representative monocyclic cycloalkyl rings include cyclopentyl, cyclohexyl, and cycloheptyl. Multicyclic cycloalkyl rings include adamantyl, octahydronaphthyl, decalin, camphor, camphane, and noradamantyl.

"Alkylene" refers to a straight or branched bivalent aliphatic hydrocarbon group having from 1 to about 20 carbon atoms, e.g., 1, 2, 3, 4, 5, 6, 7, 8, 9, 10, 11, 12, 13, 14, 15, 16, 17, 18, 19, or 20 carbon atoms. The alkylene group can be straight, branched or cyclic. The alkylene group also can be optionally unsaturated and/or substituted with one or more "alkyl group substituents." There can be optionally inserted along the alkylene group one or more oxygen, sulfur or substituted or unsubstituted nitrogen atoms (also referred to herein as "alkylaminoalkyl"), wherein the nitrogen substituent is alkyl as previously described. Exemplary alkylene groups include methylene (—CH$_2$—); ethylene (—CH$_2$—CH$_2$—); propylene (—(CH$_2$)$_3$—); cyclohexylene (—C$_6$H$_{10}$—); —CH=CH—CH=CH—; —CH=CH—CH$_2$—; wherein each of q and r is independently an integer from 0 to about 20, e.g., 0, 1, 2, 3, 4, 5, 6, 7, 8, 9, 10, 11, 12, 13, 14, 15, 16, 17, 18, 19, or 20, and R is hydrogen or lower alkyl; methylenedioxyl (—O—CH$_2$—O—); and ethylenedioxyl (—O—(CH$_2$)$_2$—O—). An alkylene group can have about 2 to about 3 carbon atoms and can further have 6-20 carbons.

"Arylene" refers to a bivalent aryl group. An exemplary arylene is phenylene, which can have ring carbon atoms available for bonding in ortho, meta, or para positions with regard to each other, i.e., respectively. The arylene group can also be napthylene. The arylene group can be optionally substituted (a "substituted arylene") with one or more "aryl group substituents" as defined herein, which can be the same or different.

The term "amino" and "amine" refer to nitrogen-containing groups such as NR$_3$, NH$_3$, NHR$_2$, and NH$_2$R, wherein R can be alkyl, branched alkyl, cycloalkyl, aryl, alkylene, arylene, aralkylene. Thus, "amino" as used herein can refer to a primary amine, a secondary amine, or a tertiary amine. In some embodiments, one R of an amino group can be a cation stabilized diazeniumdiolate (i.e., NONO$^-$X$^+$).

The terms "cationic amine" and "quaternary amine" refer to an amino group having an additional (i.e., a fourth) group, for example a hydrogen or an alkyl group bonded to the nitrogen. Thus, cationic and quarternary amines carry a positive charge.

The terms "halo", "halide", or "halogen" as used herein refer to fluoro, chloro, bromo, and iodo groups.

The term "hydroxyl" and "hydroxy" refer to the —OH group.

Fluorinated Anion Exchange Polyelectrolytes

Provided herein are polyaromatic anion exchange polyelectrolytes that are at least partially fluorinated. As such, the polyaromatic anion exchange polyelectrolytes according to embodiments of the invention may be partially fluorinated, substantially fluorinated or even completely fluorinated. C—F bonds are stronger than C—H bonds, which can minimize or prevent degradation by HO. and $HO_2$. radicals. As such, including C—F bonds in an anion exchange polyelectrolyte may increase thermal and oxidative stability and chemical inertness, may improve surface and film-forming properties, may decrease moisture absorption, and may facilitate processing compared to non-fluorinated aromatic hydrocarbon polymers. In some embodiments, polyaromatic anion exchange polyelectrolytes according to embodiments of the invention may be used as anion exchange membranes (AEMs) in alkaline fuel cells. Such AEMs may have relatively low water uptake and swelling, relatively low fuel crossover with desirable ion conductivity, and suitable chemical and electrochemical stability.

Fluorinated anion exchange polyelectrolytes according to embodiments of the invention may include at least one cationic functional group pendant therefrom. As such, the polymer backbone may include a cationic functional group directly pendant from the backbone, and/or the polymer backbone may have alkyl, oligomeric or polymeric chains grafted onto the backbone and one or more cationic functional group may be attached to the grafted chain.

As used herein, the term "polyelectrolyte" refers to polymers that include repeating units bearing an electrolyte group, such as a cationic group. The term "anionic exchange polyelectrolyte" refers to a polymer that includes repeating units that bear a cationic charge, such that the cations are fixed onto the polymer, while, under certain conditions, the counteranions may be mobile. In some embodiments, only some of the repeating units in the polyelectrolyte include an electrolyte group. For example, in some embodiments, the ratio of the repeating units that include cationic groups to the ratio of repeating units that do not include cationic groups is in a range fo 0.1 to 1. As such, in some embodiments, all of the repeating units include an electrolyte group. The fluorinated anion exchange polyelectrolytes described herein are typically solid but may also exist in other physical states, such as a gel or other semi-solid state.

In some embodiments of the invention, fluorinated anion exchange polyelectrolytes include a repeating unit of Formula I:

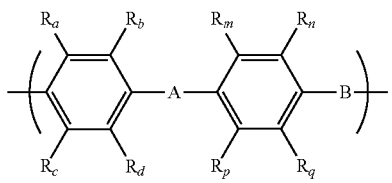

Formula I wherein

A is a single bond, alkylene, fluoroalkylene, or an arylene that is optionally substituted with a halide, alkyl, fluoroalkyl and/or cation functional group;

B is a single bond, oxygen or NR, wherein R is H, alkyl, fluoroalkyl or aryl, optionally substituted with halide, alkyl, crosslinking group and/or fluoroalkyl; and $R_a$, $R_b$, $R_c$, $R_d$, $R_m$, $R_n$, $R_p$ and $R_q$ are each independently selected from the group consisting of hydrogen, fluorine, a crosslinking group and a cationic functional group; and wherein at least one of A, B, $R_a$, $R_b$, $R_c$, $R_d$, $R_m$, $R_n$, $R_p$ and $R_q$ is fluorinated.

For example, in some embodiments, A is a single bond, B is oxygen, and $R_a$, $R_b$, $R_c$, $R_d$, $R_m$, $R_n$, $R_p$ and $R_q$ are each fluorine, forming the repeating unit of Formula I-A, shown below.

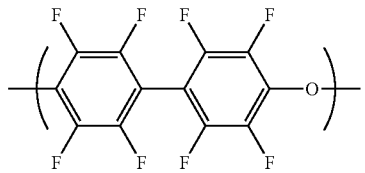

Formula I-A

As another example, in some embodiments, A is —C($CF_3$)$_2$—, B is oxygen, $R_a$, $R_b$, $R_c$, $R_d$, $R_m$, $R_n$, and $R_q$ are each independently hydrogen and $R_p$ is a cationic functional group, forming the repeating unit of Formula I-B, shown below.

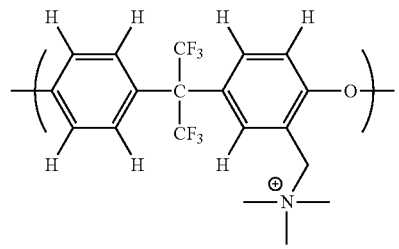

Formula I-B

As another example, in some embodiments, A is —C($CF_3$)($C_6H_5$)—, B is oxygen, $R_a$, $R_b$, $R_c$, $R_d$, $R_m$, $R_n$, and $R_q$ are each independently hydrogen and $R_p$ is a cationic functional group, forming the repeating unit of Formula I-C, shown below.

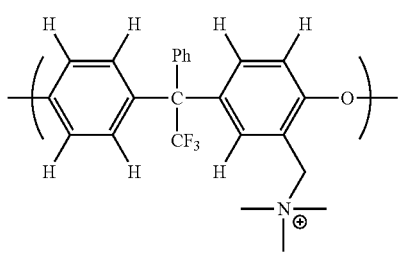

Formula I-C

In some embodiments of the invention, fluorinated anion exchange polyelectrolytes include a repeating unit of Formula II:

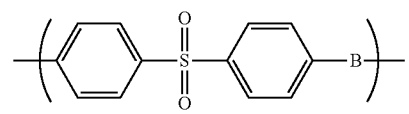

Formula II wherein B is a single bond, oxygen or NR, wherein R is H, alkyl, fluoroalkyl or aryl, optionally substituted with halide, alkyl, a crosslinking group and/or fluoroalkyl. For example, in some embodiments, fluorinated anion exchange polyelec trolytes include a repeating unit of Formula II-A, shown below.

Formula II-A

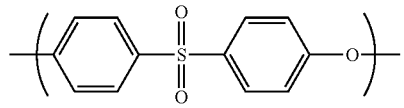

In some embodiments of the invention, fluorinated anion exchange polyelectrolytes include a repeating unit of Formula III:

Formula III

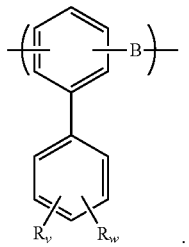

wherein B is a single bond, oxygen or NR, wherein R is H, alkyl, fluoroalkyl or aryl, optionally substituted with halide, alkyl, a crosslinking group and/or fluoroalkyl; and wherein $R_v$ and $R_w$ are each independently selected from the group consisting of hydrogen, fluorine, a crosslinking group and a cationic functional group.

For example, in some embodiments of the invention, fluorinated anion exchange polyelectrolytes include a repeating unit of Formula III-A, shown below.

Formula III-A

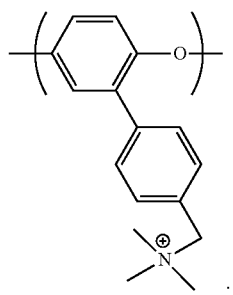

In some embodiments of the invention, fluorinated anion exchange polyelectrolytes include a cyanoarylene repeating unit. For example, in some embodiments of the invention, fluorinated anion exchange polyelectrolytes include a repeating unit of Formula IV.

Formula IV

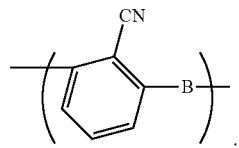

wherein B is a single bond, oxygen or NR, wherein R is H, alkyl, fluoroalkyl or aryl, optionally substituted with halide, alkyl, a crosslinking group and/or fluoroalkyl.

Polymer electrolytes containing fluorenyl groups may have relatively high ion conductivity as more ionic groups can be introduced per molecule. As such, in some embodiments of the invention, fluorinated anion exchange polyelectrolytes may include a fluorenyl repeating unit. For example, in some embodiments, fluorinated anion exchange polyelectrolytes may include the repeating unit of Formula V.

Formula V

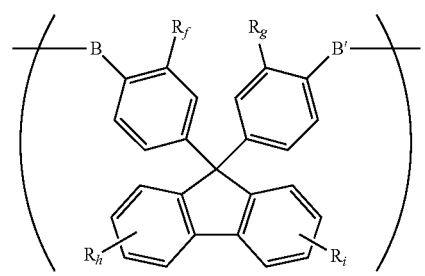

wherein B and B' are each independently a single bond, oxygen or NR, wherein R is H, alkyl, fluoroalkyl or aryl, optionally substituted with halide, alkyl, a crosslinking group and/or fluoroalkyl; and $R_f$, $R_g$, $R_h$, and $R_i$ are each independently hydrogen or a cationic functional group. For example, in some embodiments of the invention, fluorinated anion exchange polyelectrolytes may include include a repeating unit of Formula V-A, shown below.

Formula V-A

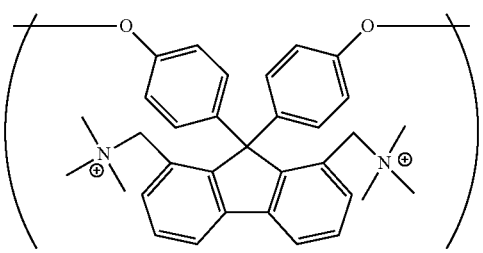

In some embodiments, two or more subunits of Formula I, II, III, IV and/or V may be combined to form larger repeating units. For example, the fluorinated anion exchange polyelectrolytes may include the repeating unit of Formula VI, which is formed from two subunits of Formula I:

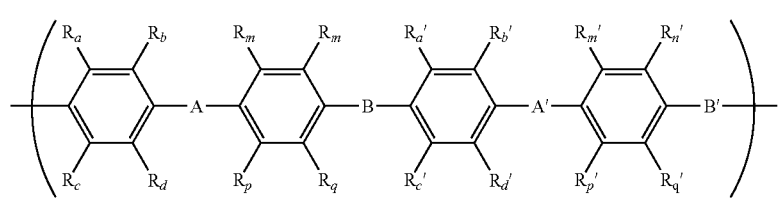

Formula VI wherein A and A' are each independently a single bond, alkylene, fluoroalkylene or arylene that is optionally substituted with a halo, alkyl and/or fluoroalkyl, B and B' are each independently a single bond, oxygen or NR, wherein R is H, alkyl, fluoroalkyl or aryl, optionally substituted with halide, alkyl, a crosslinking group and/or fluoroalkyl, and $R_a$, $R_b$, $R_c$, $R_d$, $R_m$, $R_n$, $R_p$, $R_q$ $R_a'$, $R_b'$, $R_c'$, $R_d'$, $R_m'$, $R_n'$, $R_p'$ and $R_q'$ are each independently selected from the group consisting of hydrogen, fluorine, a crosslinking group and a cationic functional group, and wherein at least one of A, A', B, B', $R_a$, $R_b$, $R_c$, $R_d$, $R_m$, $R_n$, $R_p$, $R_q$ $R_a'$, $R_b'$, $R_c'$, $R_d'$, $R_m'$, $R_n'$, $R_p'$ and $R_q'$ is fluorinated.

For example, the fluorinated anion exchange polyelectrolytes may include a repeating unit such as:

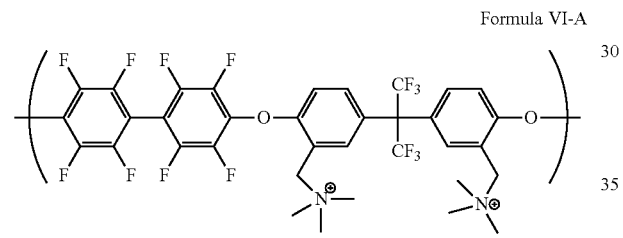

Formula VI-A

An example of a larger repeat unit formed from two different type of repeating units is the repeat unit having the structure of Formula VII:

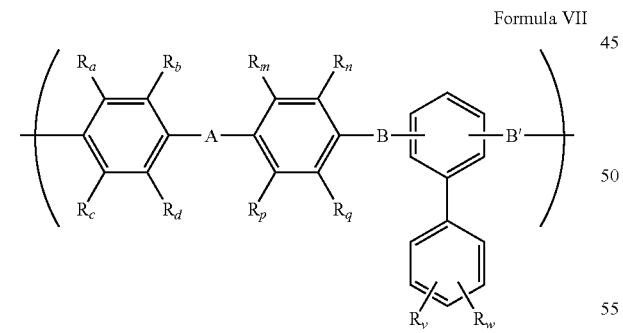

Formula VII wherein A is a single bond, alkylene, fluoroalkylene or arylene, optionally substituted with a halide, alkyl and/or fluoroalkyl, B and B' are each independently a single bond, oxygen or NR, wherein R is H, alkyl, fluoroalkyl or aryl, optionally substituted with halide, alkyl, crosslinking group and/or fluoroalkyl, and $R_a$, $R_b$, $R_c$, $R_d$, $R_m$, $R_n$, $R_p$ and $R_q$ are each independently selected from the group consisting of hydrogen, fluorine, a crosslinking group and a cationic functional group, and wherein at least one of A, $R_a$, $R_b$, $R_c$, $R_d$, $R_m$, $R_n$, $R_p$ and $R_q$ is fluorinated.

As an example, the partially fluorinated polyaromatic polyelectrolyte may include a repeat unit such as:

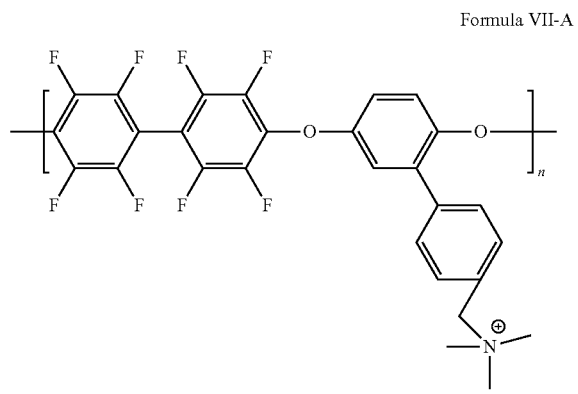

Formula VII-A

As another example of a larger repeat unit formed from two different type of repeating units is the repeat unit having the structure of Formula VIII:

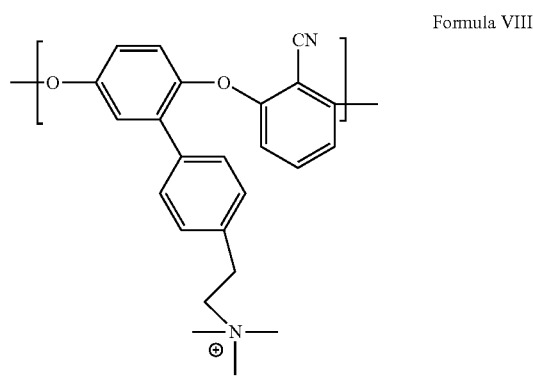

Formula VIII

Figure 1B:
FIG. 1B is a schematic illustrating how cationic sites may be located on the fluorinated anion exchange polyelectrolyte of FIG. 1A.

Another example of fluorinated anion exchange polyelectrolytes that combine different subunits is shown in FIG. 1A. As shown in the schematic of FIG. 1B, this may allow for cationic sites along the backbone of the fluorinated anion exchange polyelectrolytes.

Figure 2:
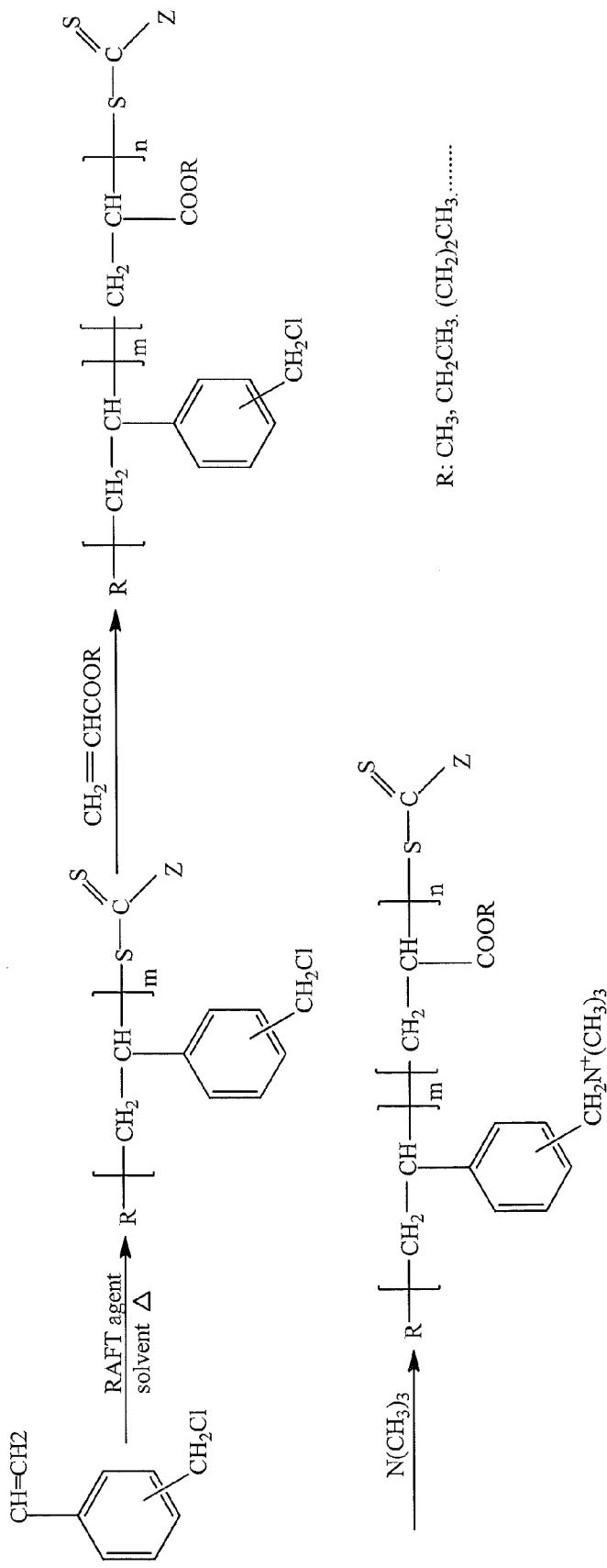
FIG. 2 provides an example of a block copolymer synthetic procedure by Reversible Addition Fragmentation Transfer (RAFT).

In some embodiments, fluorinated anion exchange polyelectrolytes include block copolymers. Amphiphilic block copolymers may self-assemble into well-connected hydrophilic ionic channels by microphase separation, and an appropriate channel may facilitate ion transport even under low humidity conditions. Block copolymer may be synthesized by any suitable method, including condensation and controlled free radical polymerization methods such as reversible addition-fragmentation transfer (RAFT) (See example of RAFT in FIG. 2). Fluorinated anion exchange polyelectrolytes may form membranes that exhibit bicontinuous microphase-separated morphology and as a result may have excellent mechanical properties and high ion conductivity.

Figure 3:
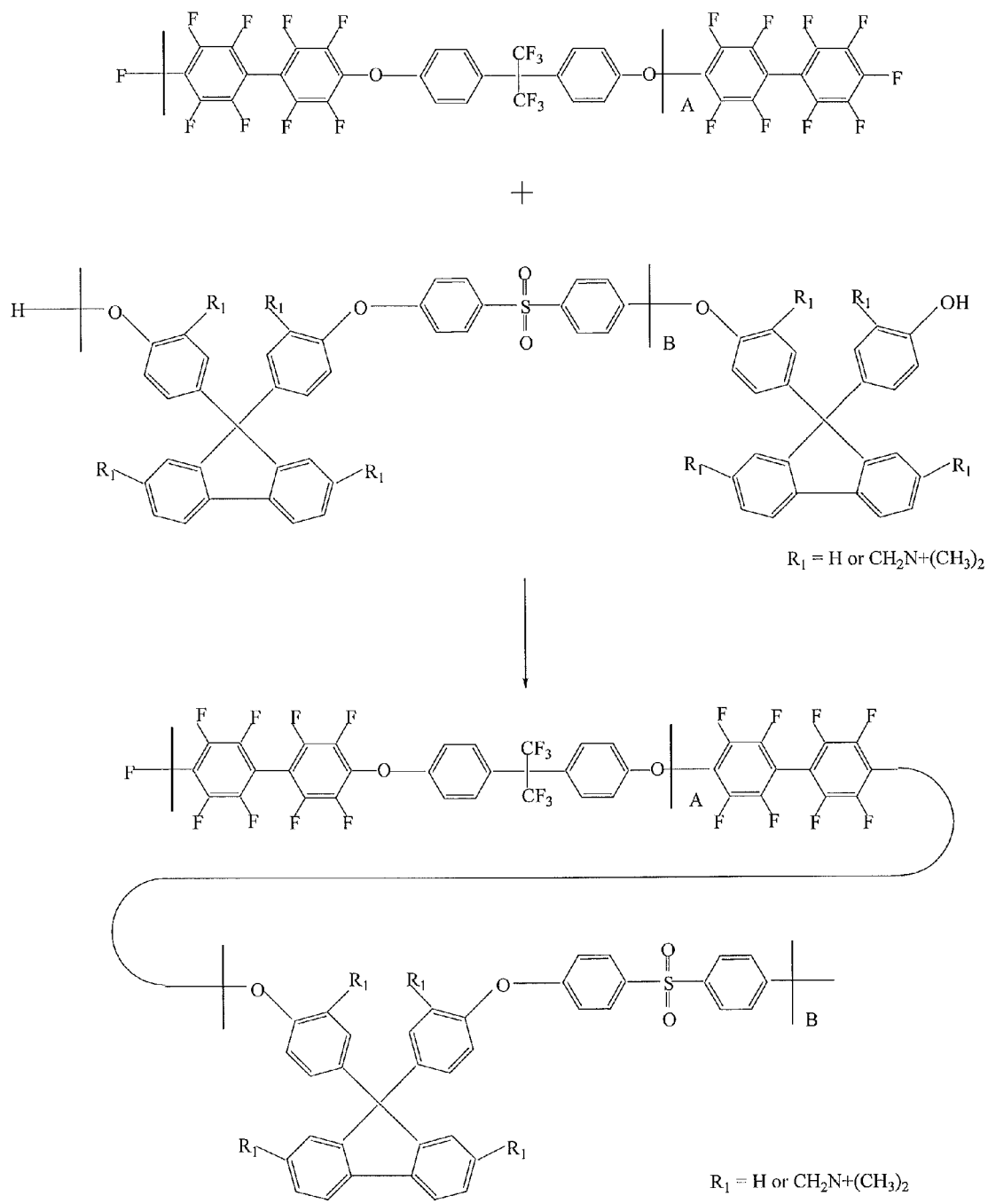
FIG. 3 provides an example of a fluorenyl-based block copolymer synthesis.

As an example, in some embodiments, provided are block copolymers that include fluorenyl groups. This block copolymer architecture composed of alternating conductive and nonconductive segments may prevent or minimize swelling and loss of mechanical strength in hot water. Such block copolymers may be synthesized through highly reactive fluorine and alcohol groups as the linkage groups for the hydrophilic and hydrophobic oligomers by polycondensation reaction (See, e.g., FIG. 3).

The fluorinated anion exchange polyelectrolytes described herein may be any suitable molecular weight. However, in some embodiments, the number average molecular weight may be in a range of about 500 to about 1 million, and in some embodiments in a range of about 100,000 to about 200,000.

Cationic Functional Groups

Any suitable cationic functional group may be used in fluorinated anion exchange polyelectrolytes according to embodiments of the invention. As an example, in some embodiments of the invention, the cationic functional group is a quaternary ammonium, guanidinium or a phosphonium ion. Simple cations such as quaternary alkyl ammonium and alkyl phosphonium cations may be used. However, in some embodiments, aliphatic alkyl based quaternary ammonium hydroxide-containing polymers may not be suitably stable at high pH. The phosphonium ion has a lower charge density than the analogous ammonium version. The lower charge density may reduce the driving force for direct nucleophilic attack by hydroxide and increase anion conductivity. However, in some cases, aliphatic alkyl or phenyl-based phosphonium hydroxides may also not have sufficient stability. As such, in some embodiments of the invention, other cations may be used for fluorinated anion exchange polyelectrolytes used to form anion exchange membranes used in alkaline fuel cell applications.

Cations that may have increased alkaline stability include those that are sterically hindered around the cation centers, which may protect the core nitrous or phosphorus atom and the a-carbon atom against hydroxide attack. At the same time, steric atoms may also take part in conjugation and may also be strong electron donors. Both may enhance the stability of the quaternary ammonium or phosphonium groups. Examples of sterically hindered groups include tris(trimethoxyphenyl) phosphonium and tri(t-butyl)pyridinium cations, shown below.

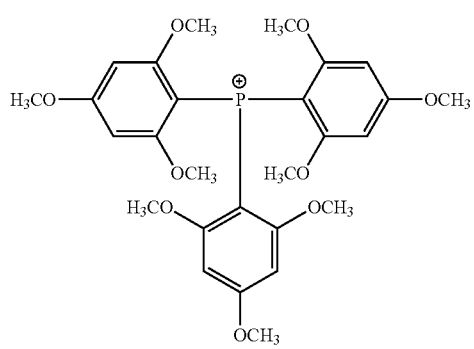

-continued

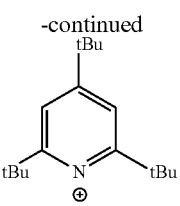

As used herein, the term "cationic functional group" is meant to include both cations and the neutral salts, such that the cation may be free or may be bound to a counterion. Examples of counteranions include hydroxide and halides such as chloride, carbonate, bicarbonate and sulfate.

Other examples of cationic functional groups include $-CH_2N^+(CH_3)_3$, $-CH_2N^+(CH_3)(C_6H_5)$ and the cations having the structure of Formula IX and Formula

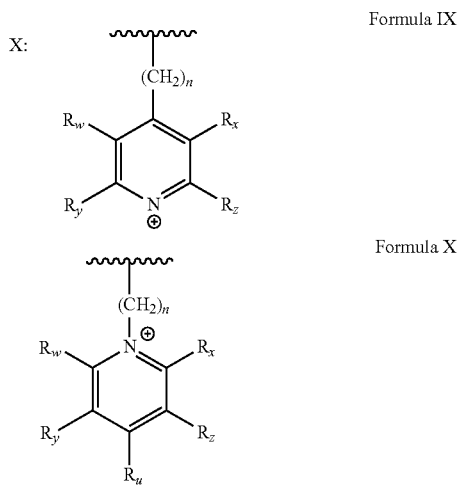

wherein $R_u$, $R_w$, $R_x$, $R_y$ and $R_z$ are each independently hydrogen, fluorine or halide and n is in a range of 0 to 50, and in some embodiments, in a range of 0 to 10.

In some embodiments of the invention, the cationic functional group is a polyaromatic polymer graft that includes at least one cationic functional group. The inclusion of a polyaromatic polymer graft having at least one cationic functional group may promote phase-separate (e.g., on the nanoscale) morphology via the separation of the hydrophilic cationic groups from the hydrophobic polymer backbone. Such fluorinated anion exchange polyelectrolytes may form membranes having desirable properties for fuel cell applications such as acceptable water swelling stability and high conductivity.

Figure 4A:
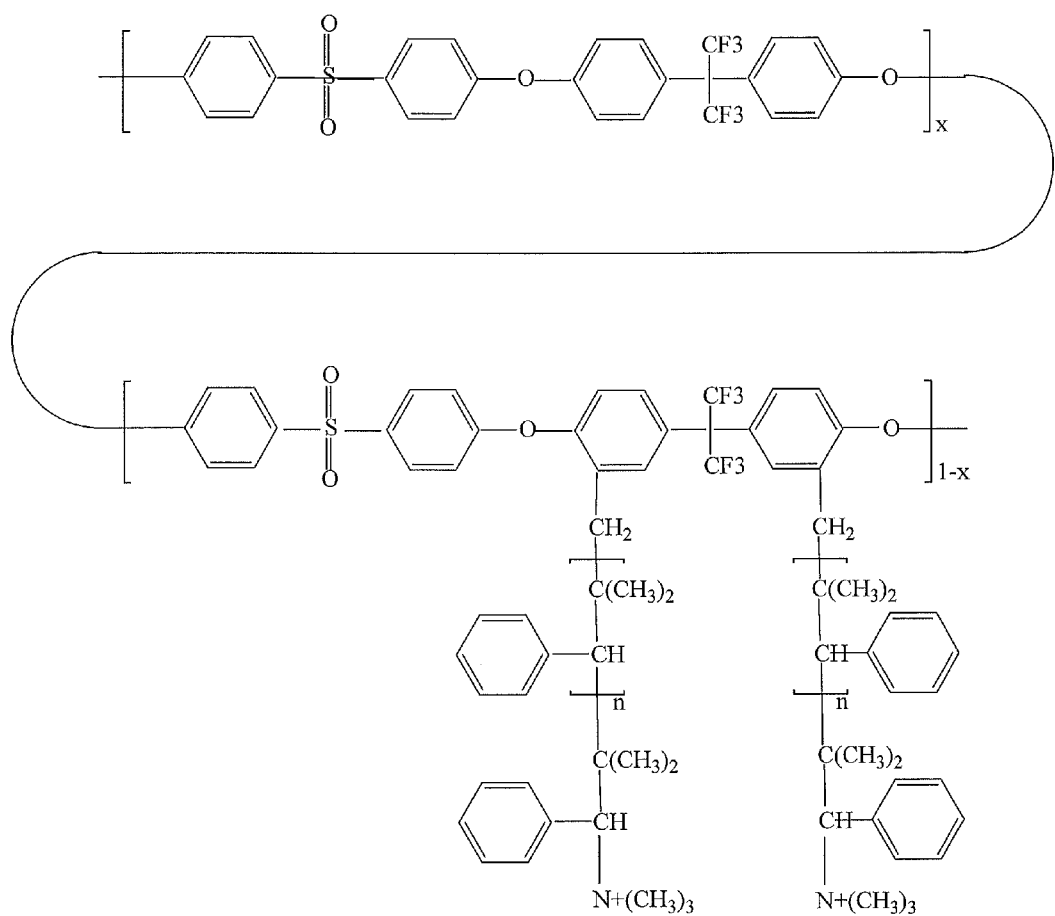
FIG. 4A shows the chemical structure of a fluorinated anion exchange polyelectrolyte according to some embodiments of the invention.
Figure 4B:
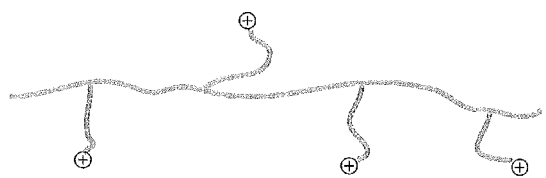
FIG. 4B is a schematic illustrating how cationic sites may be located on the fluorinated anion exchange polyelectrolyte of FIG. 4A.
Figure 5A:
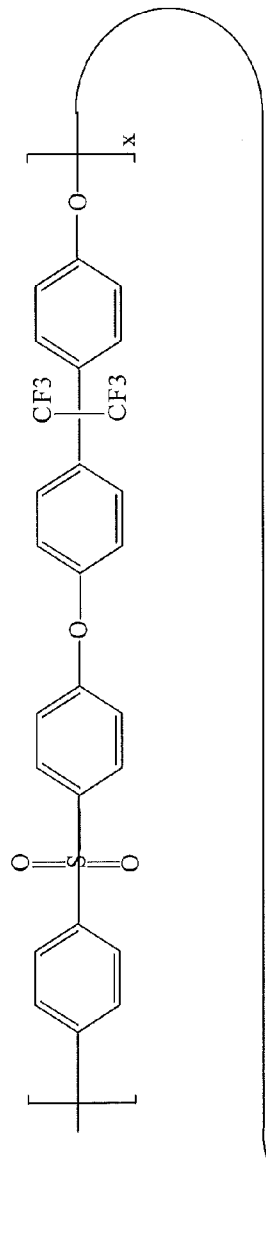
FIG. 5A shows the chemical structure of a fluorinated anion exchange polyelectrolyte according to some embodiments of the invention.
Figure 5A:
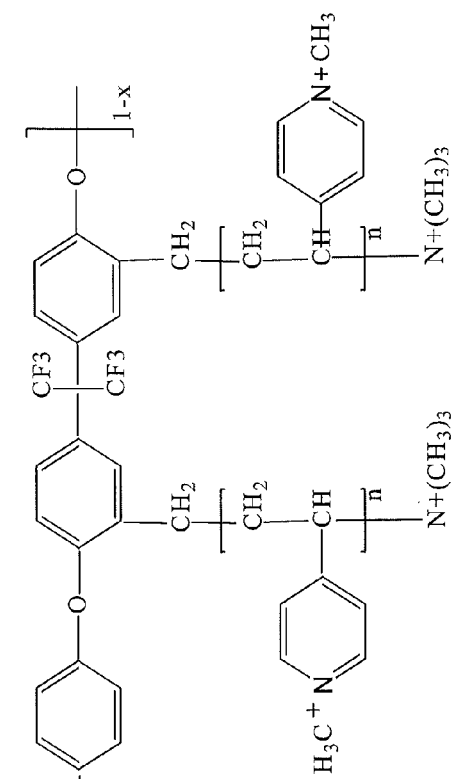
Figure 5B:
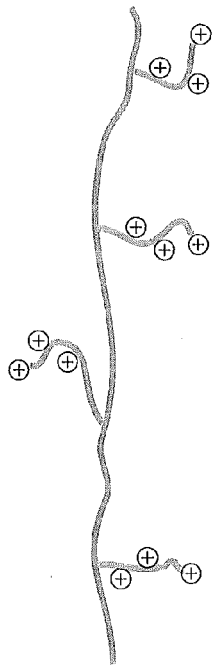
FIG. 5B is a schematic illustrating how cationic sites may be located on the fluorinated anion exchange polyelectrolyte of FIG. 5A.

The fluorinated anion exchange polyelectrolytes may be synthesized with pendant chains (which also may be referred to as "grafts") having a variety of chain lengths (FIG. 4A). As shown in the schematic of FIG. 4B, this may allow for cationic sites along the grafts of the fluorinated anion exchange polyelectrolytes. The size of ionic domains can be controlled by changing the pendant chain lengths, for example, from one monomer to oligomer chain lengths to much longer grafts. Additionally, only one cation per graft may be present, or multiple cations per graft may be present. Multiple cations per graft may allow for the use of flexible, polyionic, hydrophilic side chains (See FIGS. 5A and 5B) which are capable of promoting microphase separation, in order to create continuous ionic-channel network, which may provide better conductivity at low hydration.

As an example, in some embodiments of the invention, the fluorinated anion exchange polyelectrolytes has the structure of Formula XI:

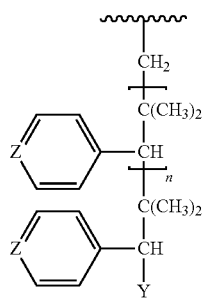

Formula XI wherein Y is a cationic functional group, Z is CH or $N^+$ and n is in a range of 0 to 50, and in some embodiments, in a range of 0 to 20. For example, in some embodiments, the polyaromatic polymer graft has the structure of Formula XI-A, shown below.

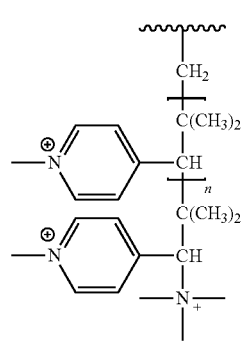

Formula XI-A

Figure 6:
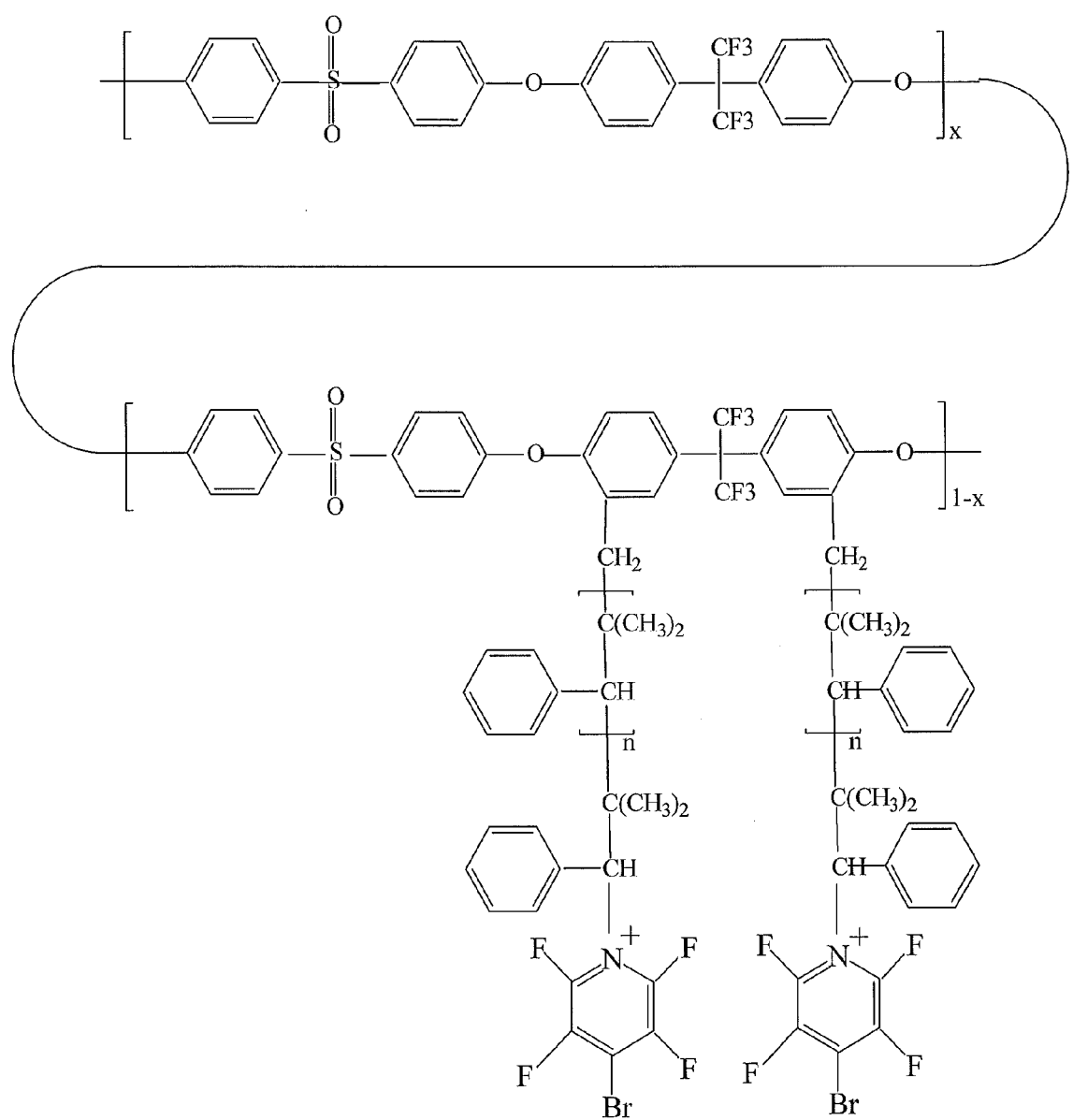
FIG. 6 shows the chemical structure of a fluorinated anion exchange polyelectrolyte according to some embodiments of the invention.

In some embodiments, hydrophobic groups, such as fluorines may be included on the polyaromatic polymer graft. The hydrophobic groups may allow for variation of the hydrophilicity of the cationic graft. For example, the polyaromatic polymer graft may have the structure of Formula XI-B, shown below (and see FIG. 6).

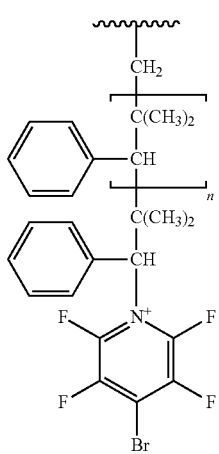

Formula XI-B

Methods of Forming Fluorinated Anion Exchange Polyelectrolytes

The fluorinated anion exchange polyelectrolytes can be formed by any suitable synthetic procedure. For example, in some embodiments, quaternary ammonium cationic polymers may be synthesized via polycondensation of monomers to form the polymer backbone, followed by chloromethylation of the aromatic functional groups, followed by amination of the chloromethyl groups to form the quaternary ammonium groups. Such a procedure is described in Zhou et al., Journal of Power Sources, 190 (2009) 285-292, which is hereby incorporated by reference.

Generally, this procedure of chloromethylation and amination is widely used to prepare anion exchange polyelectrolytes. Although it is convenient, some shortcomings exist for anion exchange polyelectrolytes prepared by the method. First, the amount of chloromethyl groups and their location along the polymer backbone may not be precisely controlled in the chloromethylation reaction. In addition, the chloromethylation regent, chloromethyl methyl ether, that is typically used is a hazardous chemical and is potentially harmful to human health. Moreover, chloromethyl methyl ether is relatively expensive, which may dramatically increase the manufacturing costs of the polyelectrolyte.

Figure 7:
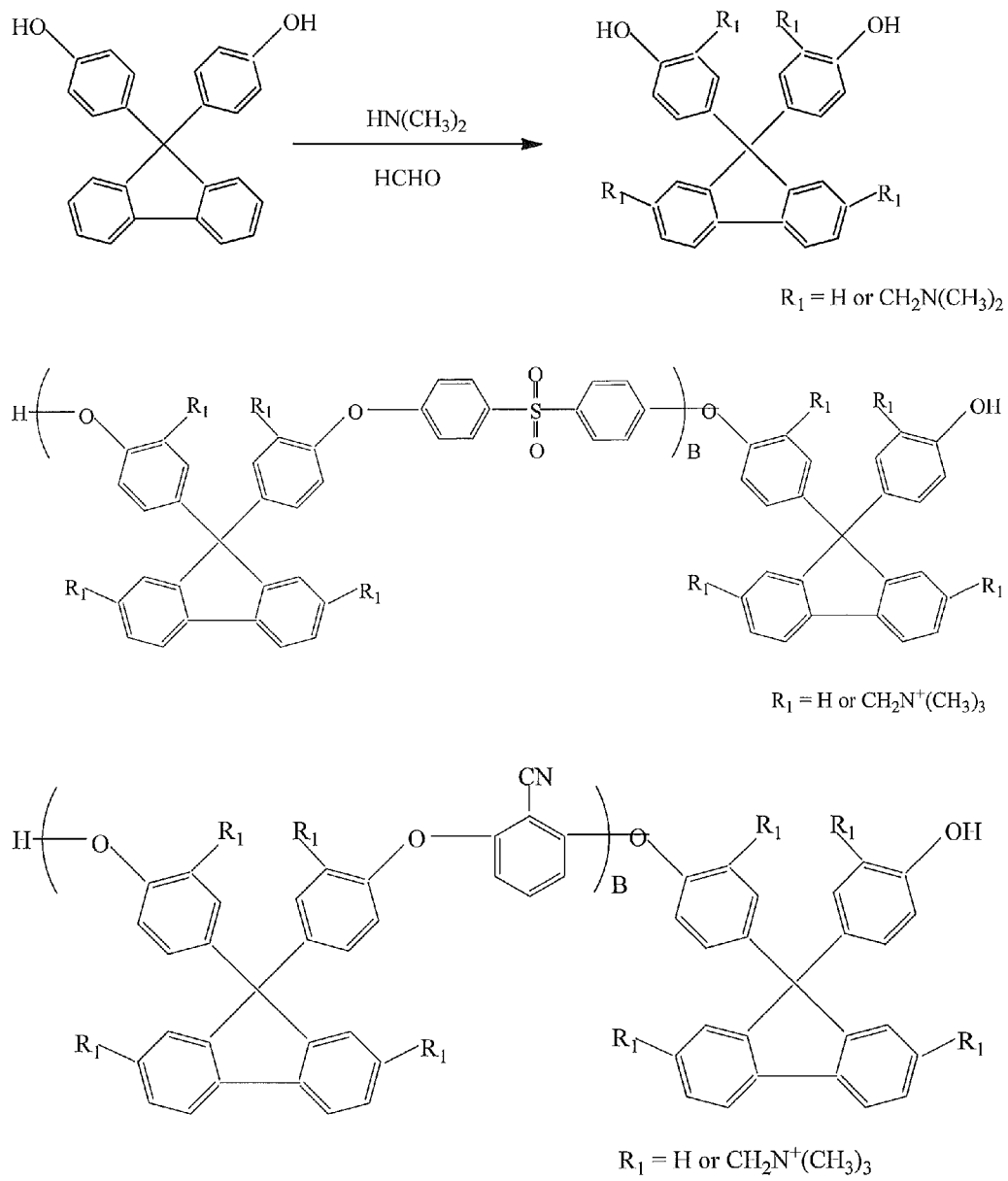
FIG. 7 shows the synthesis of a novel fluorenyl monomer and a fluorinated anion exchange polyelectrolyte that includes the fluorenyl monomer.

As such, provided according to some embodiments of the invention are methods of forming anion exchange polyelectrolytes that may avoid the use of toxic and expensive chloromethylation reagents and allow for increased ion conductivity. The synthetic procedure is shown in FIG. 7 and forms novel monomers that may form the fluorenyl repeating units of Formula V. Polymers can be formed by the polycondensation of these monomers, and then the methylation of the tertiary amine groups will result in the repeating unit of Formula V (See FIG. 7). This method may allow for close control of the polymer structure, which includes the content of the quaternary ammonium groups and their location in the polymer, by adjusting the ratio of different monomers.

Crosslinking

Higher cation density in polyelectrolytes used in AEMs may be result in higher conductivity, but may also lead to membrane swelling by water or methanol and thus may degrade performance in applications such as alkaline fuel cells. As such, in some embodiments of the invention, the fluorinated anion exchange polyelectrolyte is crosslinked, either via an external crosslinker or a crosslinking group in the fluorinated anion exchange polyelectrolyte. Crosslinking may reduce membrane swelling and improve mechanical stability.

Figure 8:
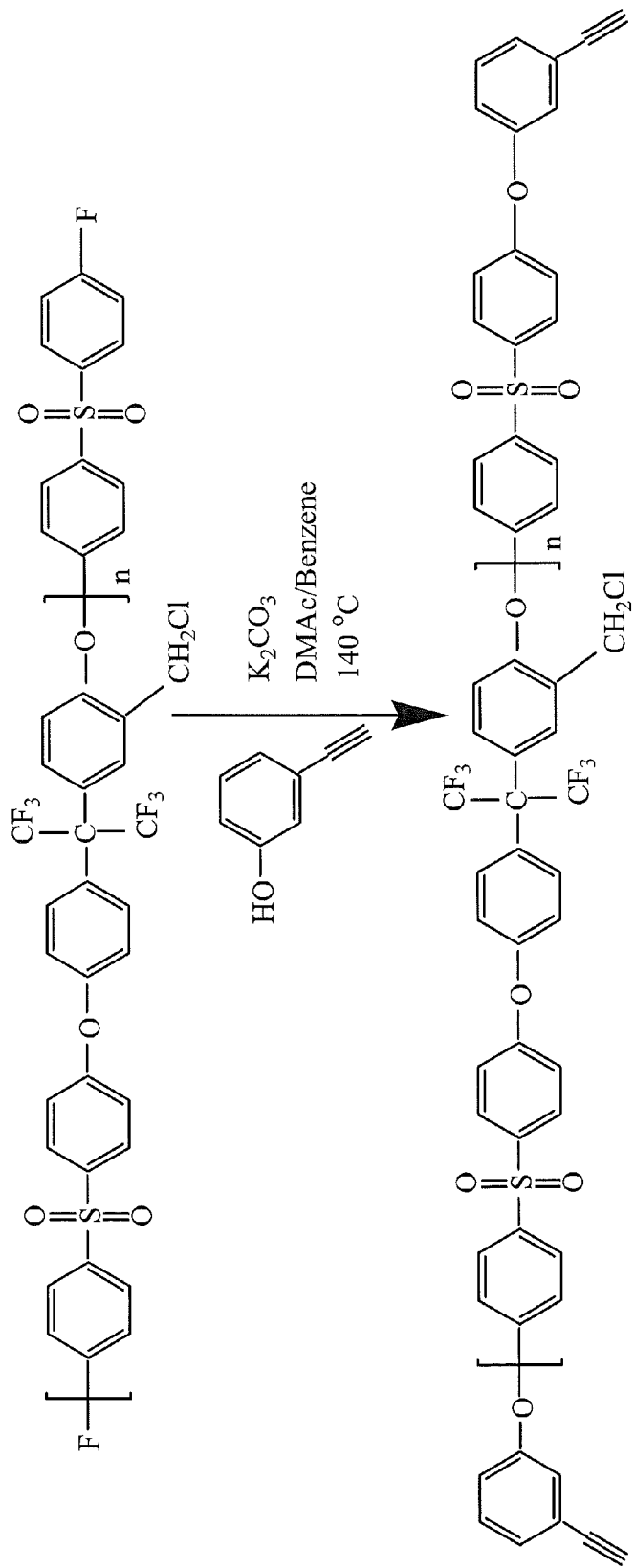
FIG. 8 illustrates a method of forming an ethynyl-terminated fluorinated anion exchange polyelectrolyte according to some embodiments of the invention.

In some embodiments of the invention, the internal crosslinking group includes at least one ethynyl group. In particular embodiments, the at least one ethynyl group is a terminal ethynyl group (see FIG. 8). In some embodiments, anion exchange polyelectrolytes having terminal ethynyl groups may be formed by the process described in FIG. 9. An ethynyl moiety at the end of the polymer as the thermal crosslinkable group may increase thermo-oxidative stability, chemical resistance and dimensional stability, and also may lead to desirable ion conductivities without decreasing ion exchange capacity values for the membranes.

Figure 9:
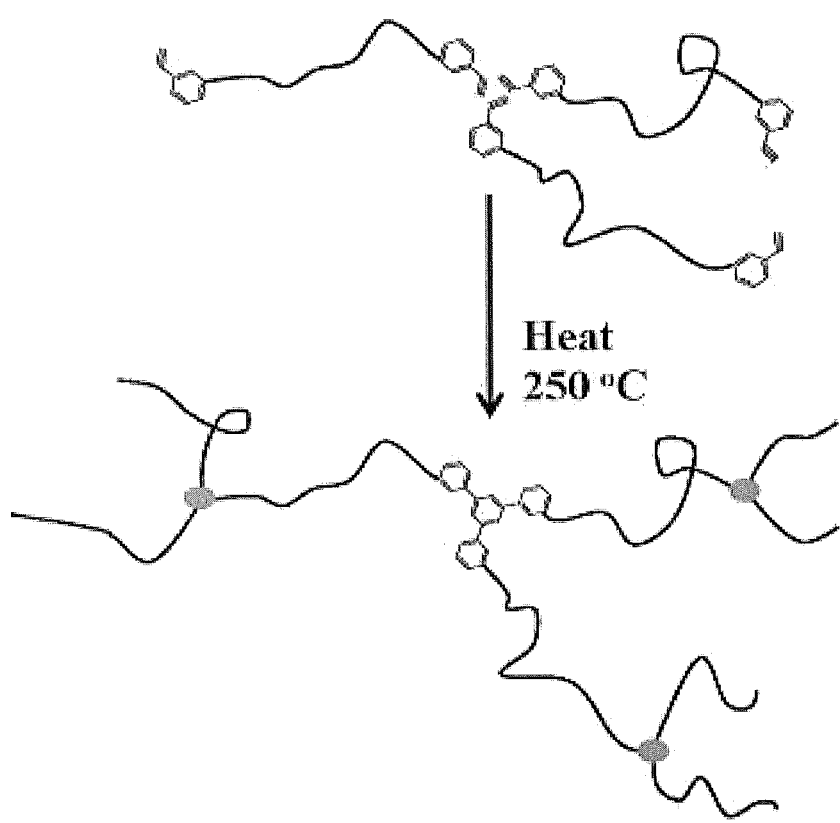
FIG. 9 is a schematic illustrating how ethynyl terminated fluorinated anion exchange polyelectrolytes may crosslink.

The formation of the cationic functional group may occur before or after crosslinking as shown in FIG. 9. For example, in some embodiments, the nonionic chloromethylated polyelectrolyte may be cured at a relateively high temperature (160° C.) and subsequently aminated in the membrane state. However, in some cases, the high curing temperature may result in a brittle material.

Figure 10:
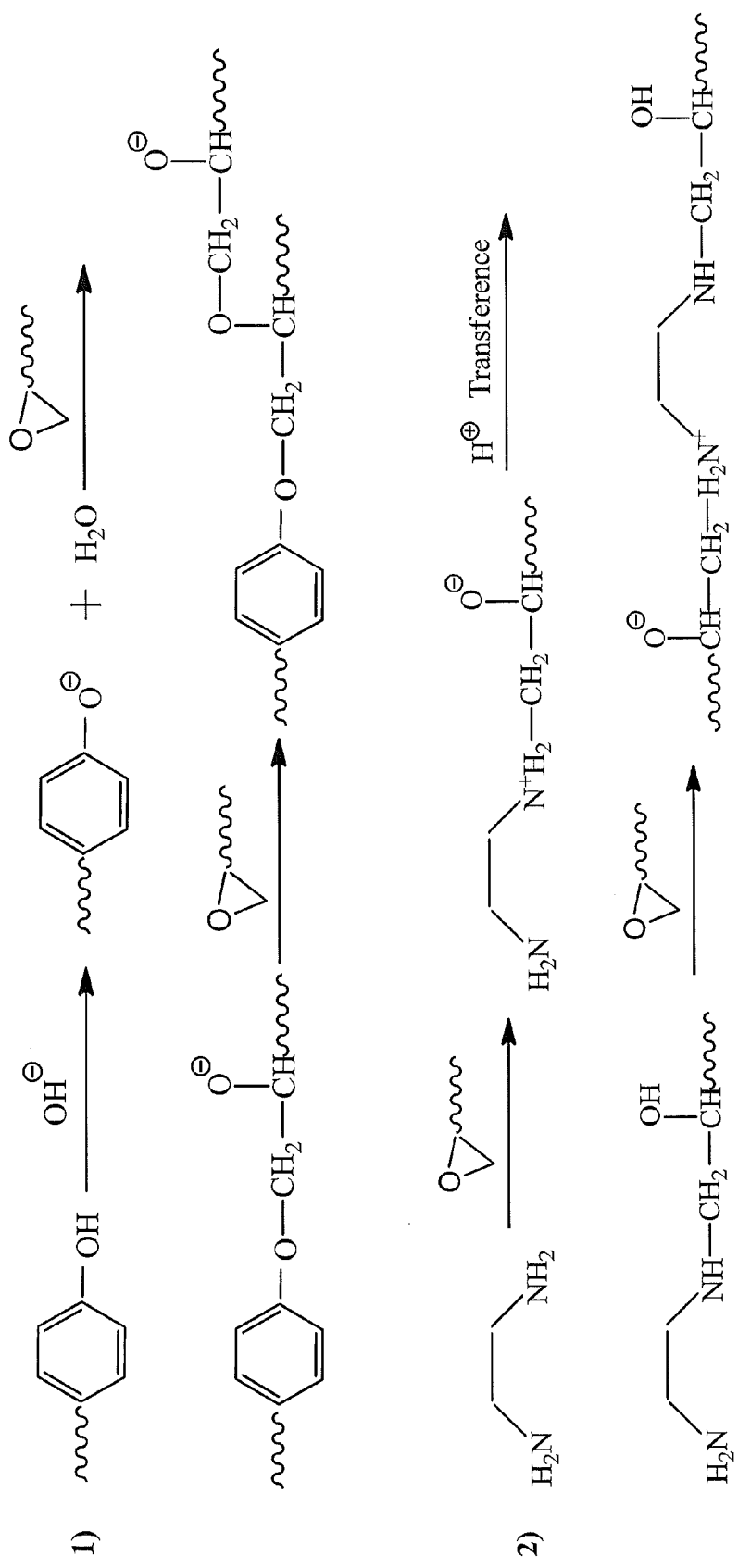
FIG. 10 illustrates a proposed mechanism for crosslinking according to some embodiments of the invention.

However, this problem may be overcome if the polyelectrolyte in the chloride form is exchanged to the hydroxide form. For example, the polyelectrolyte in its hydroxide form may be mixed with an external crosslinker and which may use a catalyst, and so may be crosslinked at relatively low temperatures such as 60° C. The possible mechanism for this crosslinking process is shown in FIG. 10. The resulting membrane may exhibit desirable physical and chemical stability in the presence of water and pure methanol, and provide excellent hydrolytic stability. Additionally, due to the low temperature required for the crosslinking reaction, it may be possible to form a suitable membrane electrode assembly (MEA) by the crosslinking reaction of epoxy groups between the electrodes (binding material is the same as the membrane) and membrane, which can further reduce the contact resistance.

Any suitable crosslinking group may be incorporated into the fluorinated anion exchange polyelectrolytes, and any suitable external crosslinker may be added to crosslink the polyelectrolytes. In some embodiments, the external crosslinker may be an epoxy functionalized crosslinker. Epoxy is one example, and other crosslinkers are known in the art. For example, in some embodiments, the crosslinker may have one of the structures shown below.

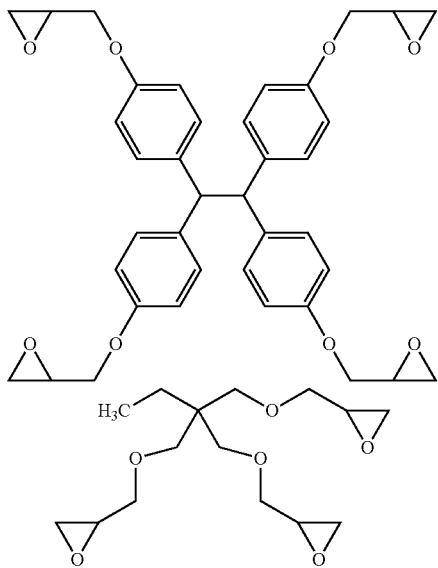

Figure 11:
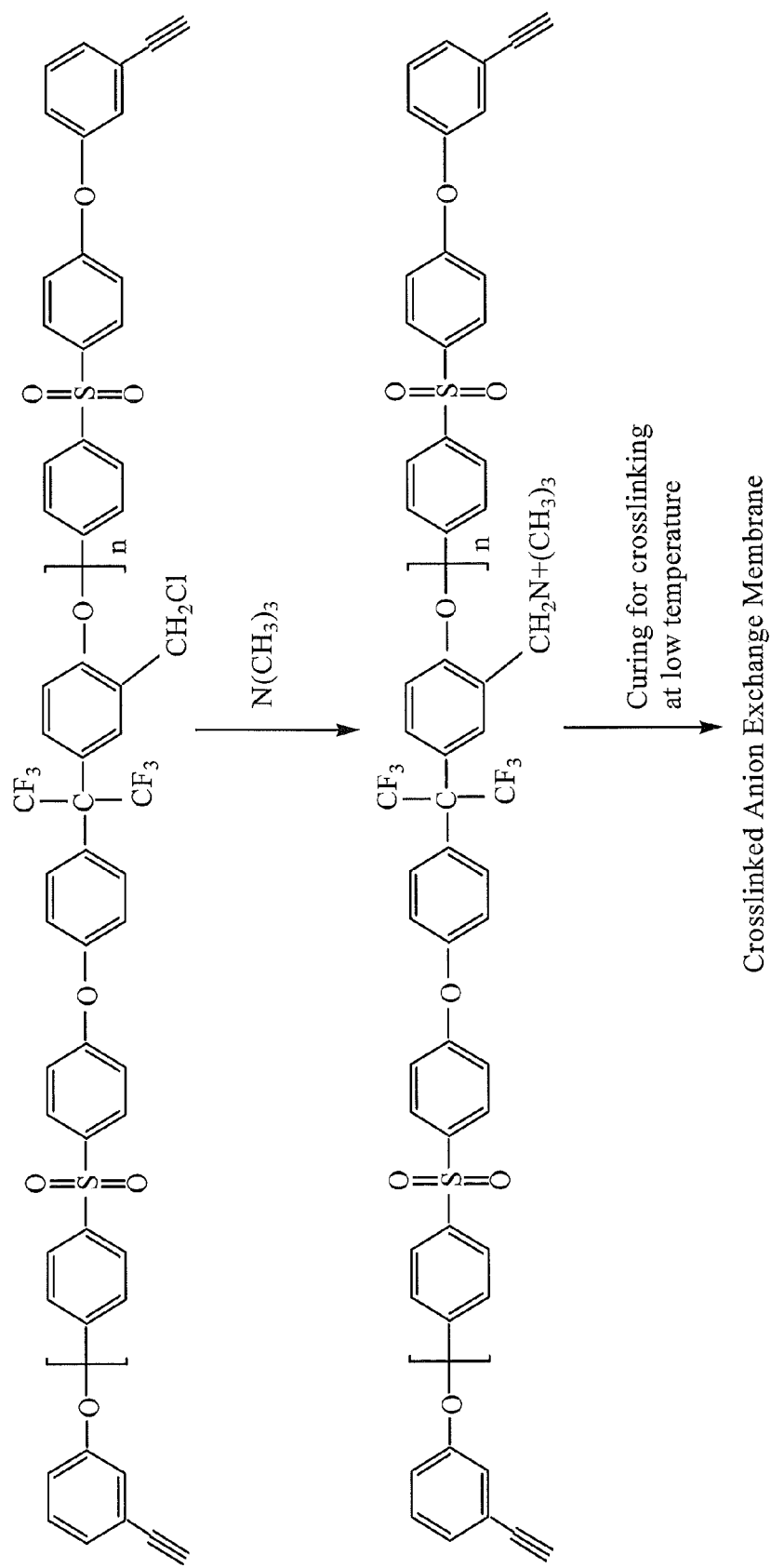
FIG. 11 illustrates a method of forming ethynyl terminated AEMs according to some embodiments of the invention.

In some embodiments, the fluorinated anion exchange polyelectrolyte may be crosslinked after formation of the cationic functional group. For example, as shown in FIG. 11, a nonionic chloromethylated polyelectrolyte may be aminated first by immersed in trimethylamine solution before the crosslinking reaction. The phase separation in the ionic membranes formed during the casting process due to the incompatibility between hydrophobic backbone and hydrophilic cations. The resulting membrane with ionic channels may then be crosslinked at low temperatures, for example, through the ethynyl moiety. Meanwhile, the degradation of quaternary ammonium groups may be minimized or avoided by this method due to the low curing temperature, so this crosslinking procedure may not substantially affect the conductivity of the final membrane.

AEMs and Method of Forming the Same

Anion exchange membranes may be formed from fluorinated anion exchange polyelectrolytes according to embodiments of the invention by any method known in the art. In some embodiments, a casting method is used. Here, casting into a membrane form may be carried out before cross-linking or after cross-linking. Further, the anion exchange membrane obtainable by the present invention may be formed not only into a common flat shape but also into a bag, hollow fiber, hollow tube shape, or any other suitable shape.

In some embodiments, the fluorinated anion exchange polyelectrolytes may be blended or mixed with another polymer to form a composite membrane. Any suitable mixing or blending process may be used, and such methods are known in the art. Examples of materials that may be desirable to blend with the fluorinated anion exchange polyelectrolytes according to embodiments of the invention include cation exchange polyelectrolytes, Teflon AF, silicone, inorganic particles such as $TiO_2$, $AlO_2$ and sol-gel materials.

In some embodiments, the membrane is formed by reinforcing a fabric with the anion exchange polymer. A liquid mixture of the reactants can be applied to the fabric by casting the liquid monomer mixture onto the fabric or by soaking the fabric in the liquid mixture using individual pieces of fabric, multiple pieces of fabric arranged in stacks or with fabric from a roll in a continuous process. When heat is applied, the reaction between the reactants and polymerization will occur to form a crosslinked anion exchange membrane supported by a fabric.

In some embodiments, the anion exchange membrane as laminated or attached to at least one other anion exchange polyelectrolyte, another polymer or another type of material to form a composite membrane. This lamination may benefit the resulting properties (e.g., conductivity) of the membrane or may be provided for dimensional stability and/or handling efficiency. The substrate for lamination and the lamination method may, for example, be a porous substrate such as a non-woven fabric of e.g. polyethylene, polypropylene or polytetrafluoroethylene, or a microporous membrane obtainable by a stretch expansion method. The lamination method may be a method wherein a preliminarily prepared anion exchange membrane and a porous substrate are bonded by a so-called wet lamination method using a solution of a precursor of the anion exchanger as an adhesive.

In another embodiment, the membrane is formed by imbibing a porous plastic film, such as polyethylene, polypropylene or Teflon®, with the fluorinated anion exchange polyelectrolytes according to embodiments of the invention. A liquid mixture of the reactants can be applied to the porous plastic film by casting the liquid monomer mixture onto the porous plastic film or by soaking the porous plastic film in the liquid mixture. When heat is applied, the reaction between the reactants and polymerization will occur to form a crosslinked fluorinated anion exchange polyelectrolyte supported by a porous plastic film.

The fluorinated anion exchange polyelectrolytes can also be polymerized into a solid mass, processed and pulverized into small particles. The small particles can then be blended in an extruder and heated with a melted plastic, such as polyethylene or polypropylene. The plastic and ion exchange mixture can then be extruded into thin sheets of AEMs.

The AEMs formed from the fluorinated anion exchange polyelectrolytes may be any suitable thickness. However, in some embodiments, the thickness of the AEM may be in a range of about 10 μm to about 1000 μm, and in some embodiments, in a range of about 20 μm to about 200 μm.

The AEMs may have any suitable ion exchange capacity. However, in some embodiments, the ion exchange capacity is in a range of about 0.1 to about 10 meq/g to about 10 meq/g, and in some embodiments, in a range of about 1 meq/g to about 5 meq/g.

The AEMs may have any suitable conductivity. However, in some embodiments, the conductivity is in a range of about $10^{-4}$ to about 1 S/cm, and in some embodiments, the conductivity is in a range of about $10^{-3}$ to about 0.3 S/cm.

AEMs are known and are used in various separation and purification applications, for example in electrodialysis, salt-splitting and metathesis. For example, anion exchange membranes described herein may be used in a method for concentrating an electrolyte by electrodialysis, wherein a cation exchange membrane or a hydrogen ion selective permeation membrane, and an anion exchange membrane, are alternately disposed between a cathode and an anode, and a voltage is applied while supplying an electrolyte solution. AEMs may also be used for water purification, as battery electrolytes and for use in carbon dioxide removal and absorption.

Alkaline Fuel Cells

The AEMs formed from the anion exchange polyelectrolytes described herein may be used in any suitable fuel cell, including alkaline fuel cells. A solid alkaline fuel cell according to the present invention typically includes two electrodes and an AEM defined above. In some embodiments, the electrodes for alkaline fuel cells are manufactured by a method of wet fabrication followed by sintering or by a method of dry fabrication through rolling and pressing components into the electrode structure. The electrode generally consists of a hydrophilic catalyzed layer on top of a porous conductive diffusion layer (homogeneous distribution of the fuel and oxidant, respectively), which is in turn bonded to a current collector that is usually metallic. In some embodiments, the electrode structure is built up from several layers obtainable by, e.g., sequential deposition of catalyst and catalyst electrolyte mixtures.

In the some alkaline fuel cells, air or oxygen may be used as the oxidizer and an alcohol, such as methanol, ethanol, or isopropanol, or an organic compound, such as dimethyl ether, may be used as the fuel in the form of a solution containing a water component. A water component contained in those fuels may be transported to the oxidizer in the heating/humidifying part to humidify the oxidizer. The structure, components and methods of forming and using fuel cells are known in the art as described in Ünlü, M.; Zhou, J.; Kohl, P. A. Hybrid Polymer Electrolyte Fuel cells: Alkaline Electrodes with Proton Conducting Membrane. Angewandte Chemie 2010, 49, pp 1321-1323; Zhou, J; Ünlü, M.; Anestis-Richard, I.; Kohl, P. A. Crosslinked, epoxy-based anion conductive membranes for alkaline membrane fuel cells. *Journal of Membrane Science* 2010, 350, pp 286-292; Unlu, M.; Zhou, J.; Kohl, P. A. Hybrid Anion and Proton Exchange Membrane Fuel Cells. *Journal of Physical Chemistry* 2009, 113, pp 11416-11423.

EXAMPLES

Example 1

A partially fluorinated, polyaromatic-based condensation polymer containing ionic functionality located along the polymer backbone (shown in FIG. 1) was synthesized through the polycondensation, chloromethylation, and amination reactions, by the procedures described in Zhou et al., J. Power Sources, 2009, 190(2), 285-292, which is incorporated by reference in its entirety. As described in detail in this reference, QAPSF-2 has more cationic sites on the polymer backbone than QAPSF-1.

Figure 12:
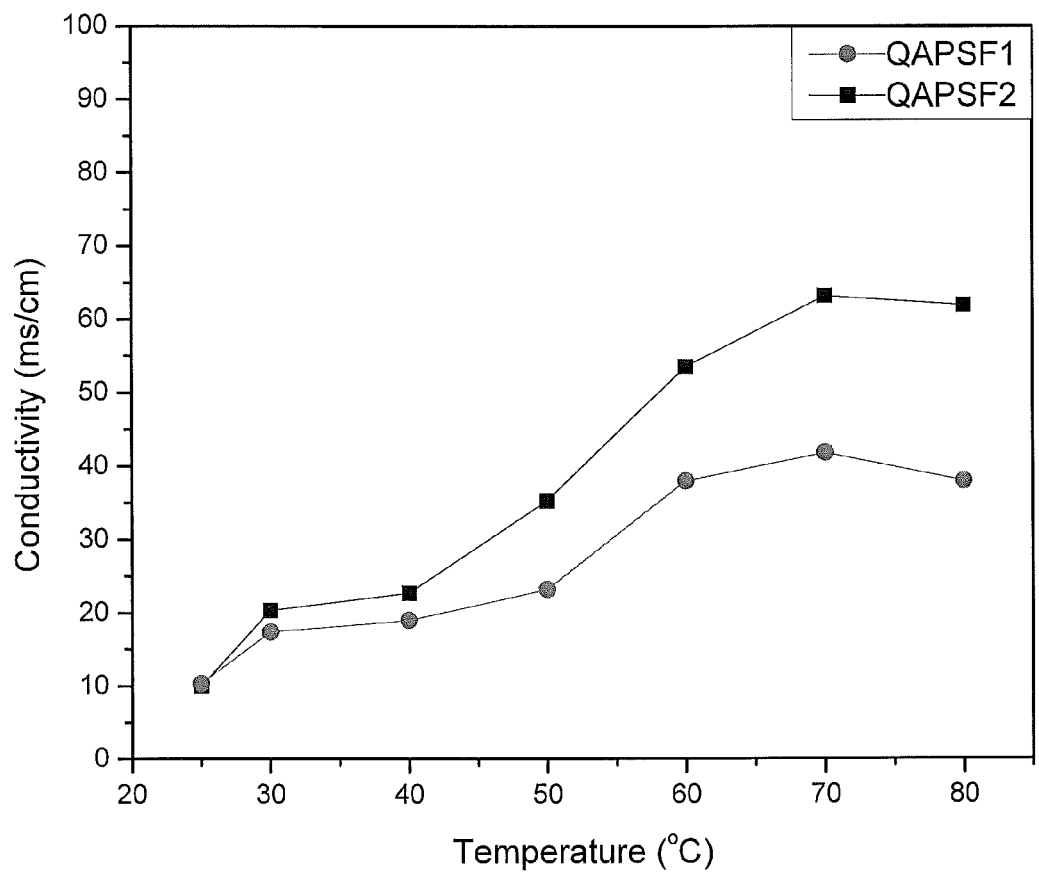
FIG. 12 is a graph illustrating the effect of temperature on the conductivity of two AEMs according to some embodiments of the invention.

The polymer was cast from DMF solvent on Teflon plates to form clear and flexible anionic exchange polyelectrolytes. The carbonate ions in the AEMs exhibit excellent conductivities up to 63.12 ms/cm at 70° C. (See FIG. 12).

Example 2

Crosslinked, epoxy-based anion conductive membranes were successfully crosslinked via epoxy functionalities (shown below) resulting in improved mechanical properties. Synthesis and characterization data my be found in Zhou et al., J. Membr. Sci, 2010, 350, 286-292, which is incorporated by reference in its entirety.

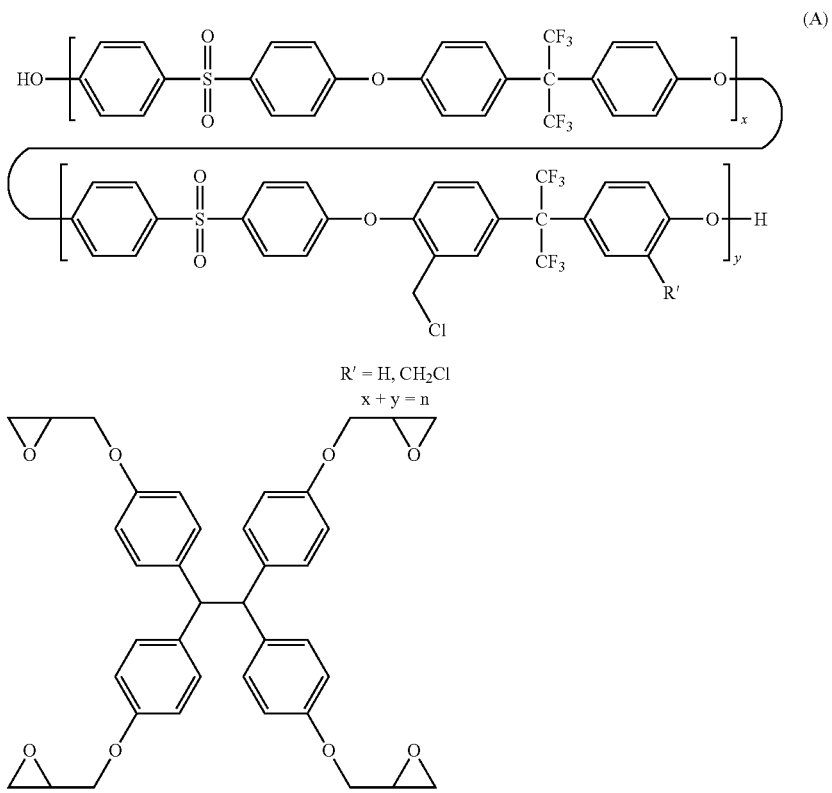

Figure 13:
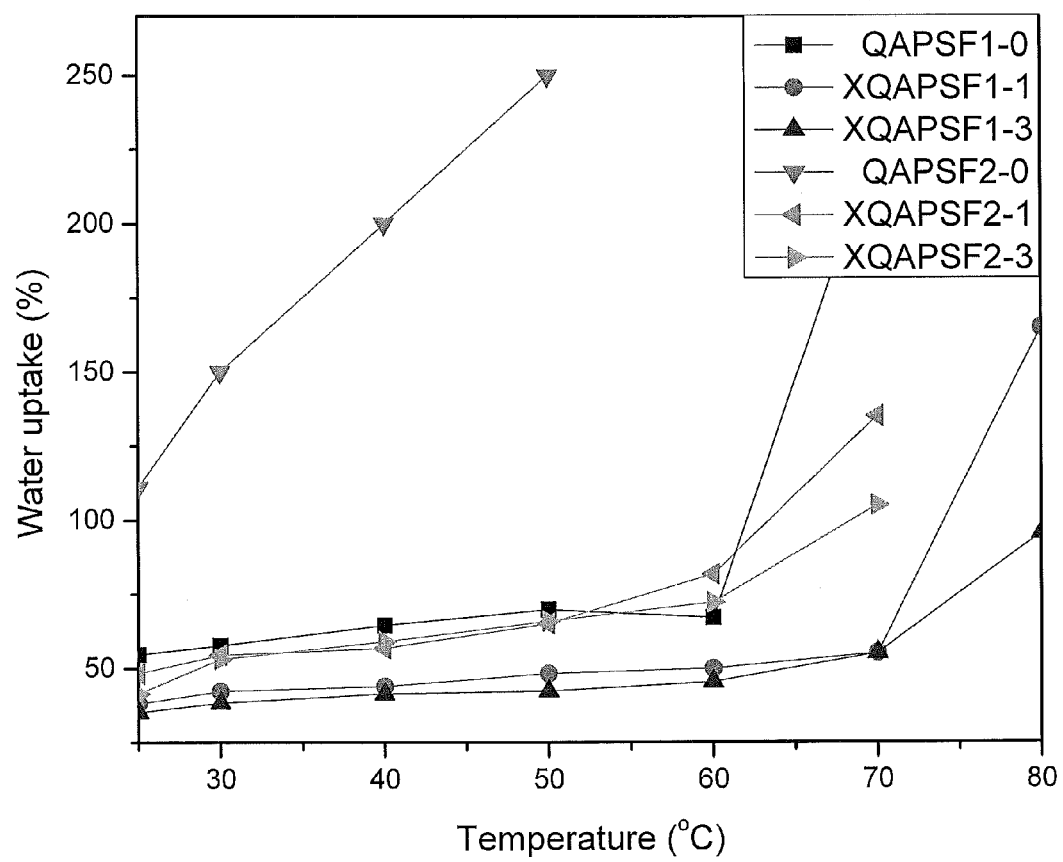
FIG. 13 is a graph illustrating the effect of temperature on the water uptake (%) of several AEMs according to some embodiments of the invention.
Figure 14:
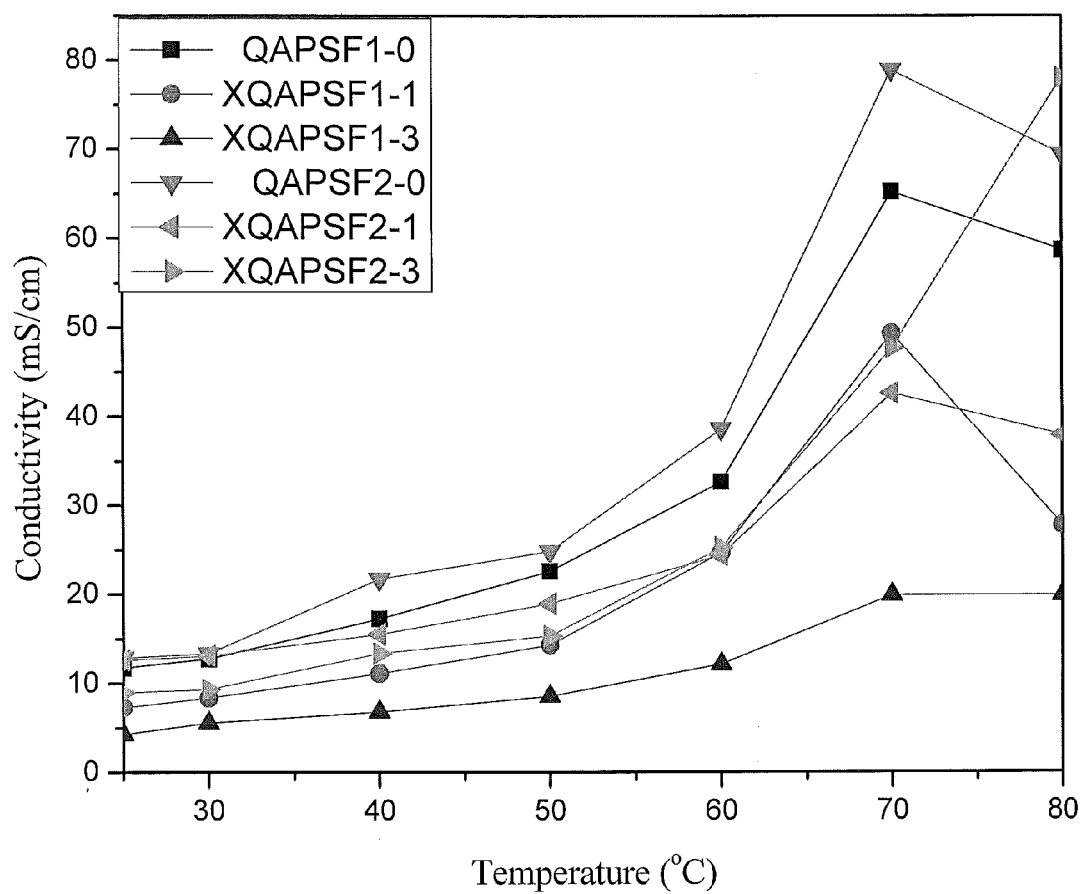
FIG. 14 is a graph illustrating the effect of temperature on the conductivity of several AEMs according to some embodiments of the invention.

The concentration of the epoxy crosslinker, tetraphenylolethane glycidyl ether (4EP), controlled the degree of crosslinking. The properties of the crosslinked membranes were investigated. See Table 1 and FIGS. 13 and 14.

| Sample | 4EP content (wt. %) | DC[a] | IEC (meq/g)[b] | IEC (meq/g)[c] |
|---|---|---|---|---|
| QAPSF1-0 | 0 | 1.21 | 1.83 | 1.31 |
| XQAPSF1-1 | 1 | — | — | 1.19 |
| XQAPSF1-3 | 3 | — | — | 0.73 |
| QAPSF2-0 | 0 | 1.45 | 2.18 | 1.63 |
| XQAPSF2-1 | 1 | — | — | 1.36 |
| XQAPSF2-3 | 3 | — | — | 0.87 |

[a]Degree of chloromethylation = (number of chloromethyl groups/repeat unit), calculated from $^1$H NMR spectra.
[b]Theoretical IEC calculated from $^1$H NMR.

All of the crosslinked membranes had good thermal stability, low water uptake (See FIG. 13) low swelling, and low methanol permeability compared to non-crosslinked membranes. Although the ionic conductivity of crosslinked membranes (SEE FIG. 14) is slightly lower, a higher selectivity (ratio of the ionic conductivity to the methanol permeability) was obtained. The results show that crosslinked membranes have potential to be used as anion exchange membranes for alkaline membrane fuel cells.

Example 3

Figure 15:
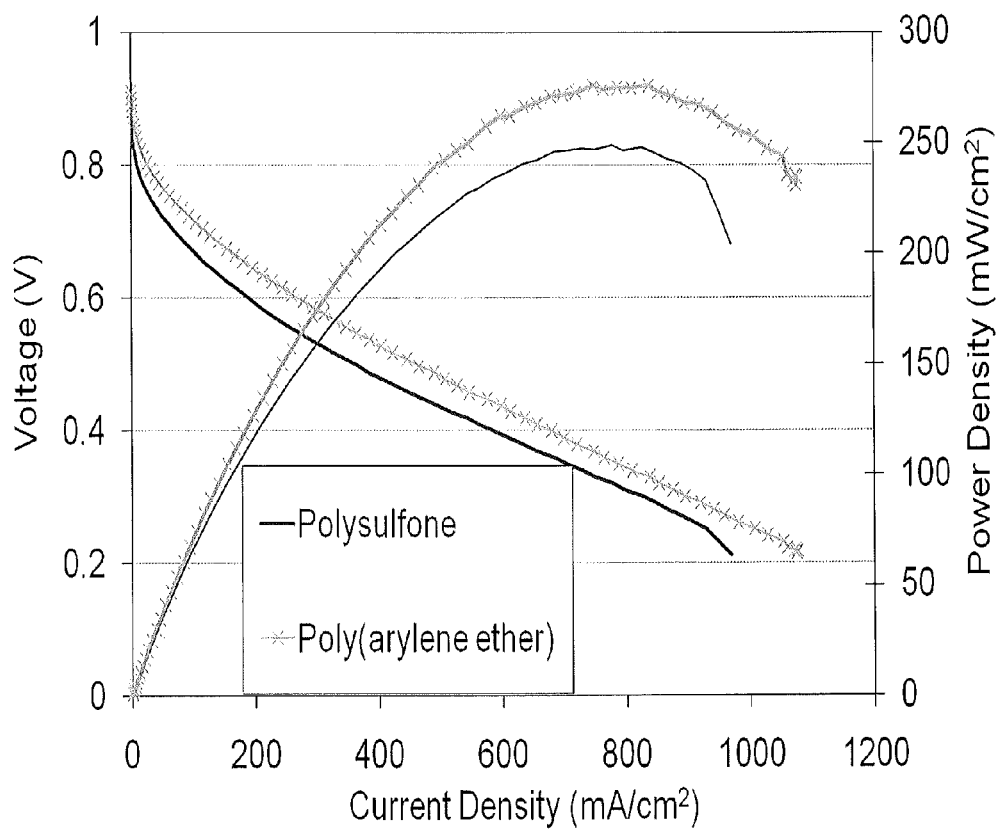
FIG. 15 provides a synthetic procedure for the formation of AEMs according to some embodiments of the invention.

Partially fluorinated copoly(arylene ether)s polyelectrolyte with pendant quaternary ammonium groups were developed (shown below). The synthetic procedure is shown in FIG. 15.

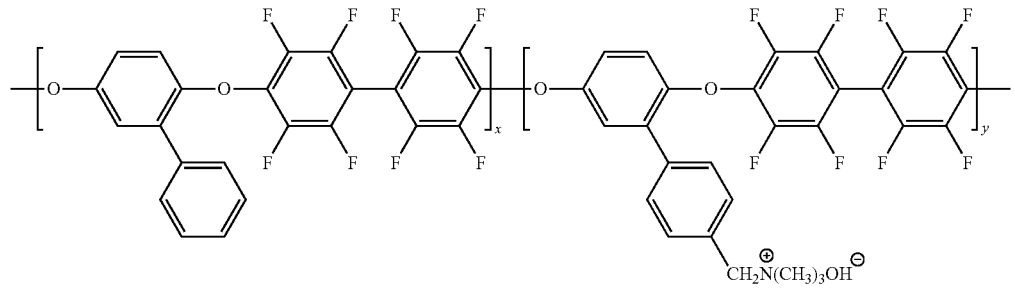

The resulting polyelectrolytes had lower water uptake and swelling compared to previous polysulfone ionomers tested, and also exhibited excellent ion conductivity and good chemical and electrochemical stability in high pH (See Table 1).

TABLE 1

Ion Exchange Capacity, Water Uptake, and Hydroxide Conductivity of Different Polyelectrolytes

| Sample | IEC (mequiv/g) | Water Uptake (wt %) 25° C. | Water Uptake (wt %) 60° C. | Conductivity (ms/cm) 25° C. | Conductivity (ms/cm) 60° C. |
|---|---|---|---|---|---|
| Poly(arylene ether)-1 | 0.79 | 37.27 | 40.38 | 15.3 | 22.86 |
| Poly(arylene ether)-2 | 1.22 | 55.02 | 75.20 | 18.3 | 28.80 |
| Polysulfone containing trifluomethyl groups (FIG. 1) | 1.21 | 76.61 | 80.91 | 21.2 | — |

Figure 16:
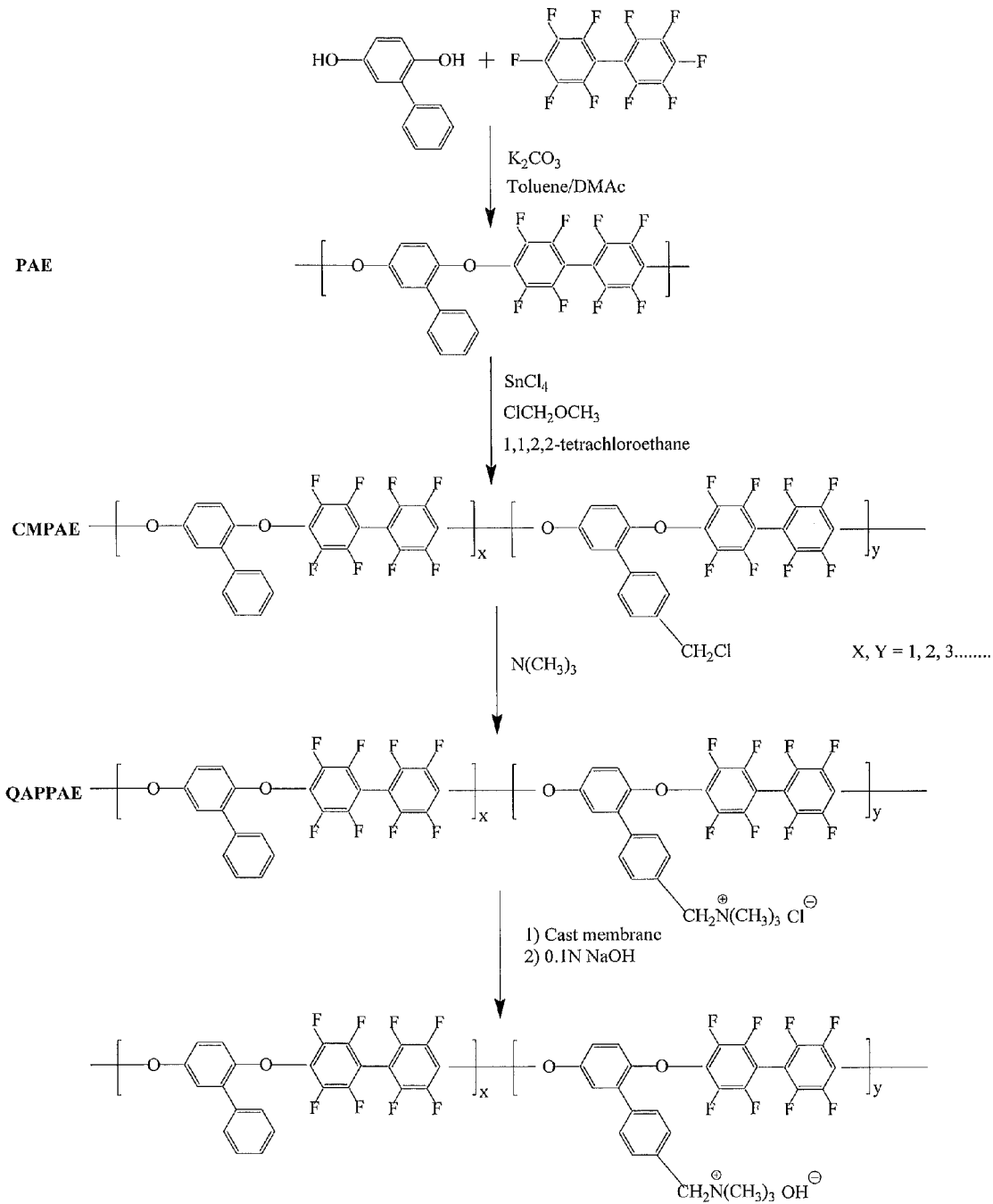
FIG. 16 is a graph of the polarization curves and power density of the hybrid cell at 60° C. for polysulfone and a poly(arylene ether) according to some embodiments of the invention.

As shown in FIG. 16, the desirable fuel cell performance can be achieved by using this polyelectrolyte in the AEM.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

We claim:
1. An anion exchange polyelectrolyte comprising:
    an at least partially fluorinated polyaromatic polymer backbone; and
    at least one cationic functional group pendant from said at least partially fluorinated polyaromatic polymer backbone, wherein said at least partially fluorinated polyaromatic polymer backbone comprises a repeating unit of Formula I:

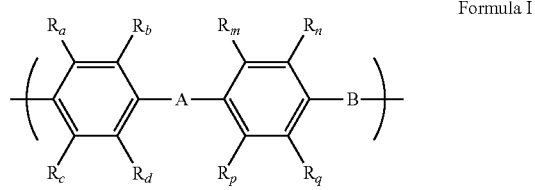

Formula I wherein:

A is a single bond;

B is a single bond, oxygen or NR, wherein R is H, alkyl, fluoroalkyl or aryl, optionally substituted with halide, alkyl, a crosslinking group and/or fluoroalkyl; and $R_a$, $R_b$, $R_c$, $R_d$, $R_m$, $R_n$, $R_p$ and $R_q$ are each independently selected from the group consisting of hydrogen, fluorine, a crosslinking group and a cationic functional group; and wherein at least one of A, B, $R_a$, $R_b$, $R_c$, $R_d$, $R_m$, $R_n$, $R_p$ and $R_q$ is fluorinated and at least one of A, B, $R_a$, $R_b$, $R_c$, $R_d$, $R_m$, $R_n$, $R_p$ and $R_q$ has a cationic functional group pendant.

2. The anion exchange polyelectrolyte of claim 1, wherein B is oxygen, and $R_a$, $R_b$, $R_c$, $R_d$, $R_m$, $R_n$, $R_p$ and $R_q$ are each independently hydrogen or a cationic functional group.

3. The anion exchange polyelectrolyte of claim 2, wherein the cationic functional group is —$CH_2N^+(CH_3)_3$.

4. The anion exchange polyelectrolyte of claim 2 wherein the cationic functional group comprises a polymer graft comprising at least one cationic group.

5. The anion exchange polyelectrolyte of claim 4, wherein the cationic functional group has the structure of Formula XI:

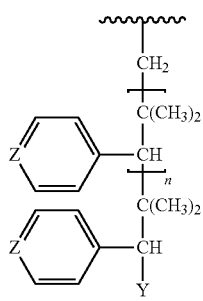

Formula XI wherein Y is a cationic functional group, Z is CH or N and n is in a range of 0 to 50.

6. The anion exchange polyelectrolyte of claim 1, wherein the at least partially fluorinated polyaromatic polymer backbone comprises a polysulfone repeating unit.

7. The anion exchange polyelectrolyte of claim 6, wherein the polysulfone repeating unit has the structure of Formula II:

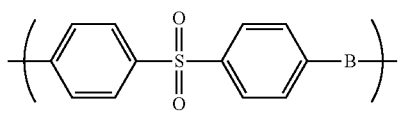

Formula II wherein B is a single bond, oxygen or NR, wherein R is H, alkyl, fluoroalkyl or aryl, optionally substituted with halide, alkyl, a crosslinking group and/or fluoroalkyl.

8. The anion exchange membrane of claim 1, wherein the at least partially fluorinated polyaromatic polymer backbone comprises a polyarylene ether repeating unit.

9. The anion exchange polyelectrolyte of claim 8, wherein the polyarylene ether repeating unit has the structure of Formula III:

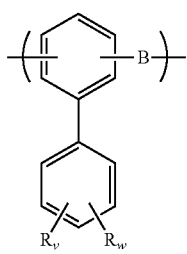

Formula III wherein B is a single bond, oxygen or NR, wherein R is H, alkyl, fluoroalkyl or aryl, optionally substituted with halide, alkyl, a crosslinking group and/or fluoroalkyl; and wherein $R_v$ and $R_w$, are each independently selected from the group consisting of hydrogen, fluorine, a crosslinking group and a cationic functional group.

10. The anion exchange polyelectrolyte of claim 9, wherein the polyarylene ether repeating unit has the structure of Formula III-A:

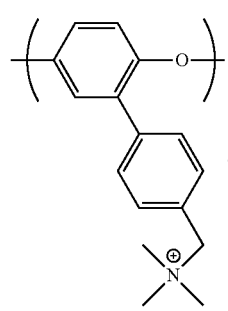

Formula III-A

11. The anion exchange polyelectrolyte of claim 1, wherein the at least partially fluorinated polyaromatic polymer backbone further comprises a cyanoarylene repeating unit.

12. The anion exchange polyelectrolyte of claim 11, wherein the cyanoarylene repeating unit has the structure of Formula IV:

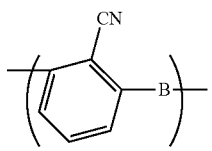

Formula IV wherein B is a single bond, oxygen or NR, wherein R is H, alkyl, fluoroalkyl or aryl, optionally substituted with halide, alkyl, a crosslinking group and/or fluoroalkyl.

13. The anion exchange polyelectrolyte of claim 1, wherein the at least partially fluorinated polyaromatic polymer backbone further comprises a fluorenyl repeating unit.

14. The anion exchange polyelectrolyte of claim 13, wherein the fluorenyl repeating unit has the structure of Formula V:

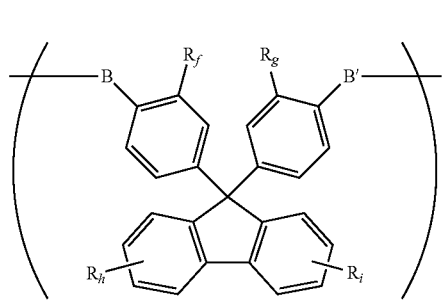

Formula V wherein B and B' are each independently a single bond, oxygen or NR, wherein R is H, alkyl, fluoroalkyl or aryl, optionally substituted with halide, alkyl, a crosslinking group and/or fluoroalkyl; and $R_f$, $R_g$, $R_h$ and Rj are each independently hydrogen or a cationic functional group.

15. The anion exchange polyelectrolyte of claim 1, wherein the crosslinking group is a haloalkyl and the anion exchange membrane further comprises at least one ethynyl group.

16. The anion exchange polyelectrolyte of claim 15, wherein the at least one ethynyl group is a terminal ethynyl group.

17. The anion exchange polyelectrolyte of claim 1, wherein the anion exchange membrane is crosslinked via a crosslinking group in the at least partially fluorinated polyaromatic polymer backbone.

18. The anion exchange polyelectrolyte of claim 1, wherein the crosslinking group of the at least partially fluorinated polyaromatic polymer backbone is crosslinked with an epoxy crosslinker.

19. The anion exchange polyelectrolyte of claim 1, wherein the cationic functional group is a quaternary ammonium, guanadinium or a phosphonium group.

20. The anion exchange polyelectrolyte of claim 1, wherein the at least partially fluorinated polyaromatic polymer backbone comprises a block copolymer.

21. The anion exchange polyelectrolyte of claim 1, wherein the fluorinated polyaromatic polymer backbone is completely fluorinated.

22. The anion exchange polyelectrolyte of claim 1, wherein said at least partially fluorinated polyaromatic polymer backbone comprises the repeating unit of Formula I-A:

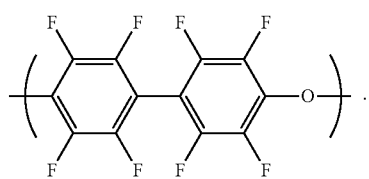

Formula I-A

23. An alkaline fuel cell comprising the anion exchange polyelectrolyte of claim 1.

* * * * *